US009723921B2

(12) United States Patent
Battey

(10) Patent No.: US 9,723,921 B2
(45) Date of Patent: *Aug. 8, 2017

(54) TABLE AND LECTERN FURNITURE SYSTEM

(71) Applicant: Steelcase Inc., Grand Rapids, MI (US)

(72) Inventor: David J. Battey, Caledonia, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,072

(22) Filed: Oct. 20, 2015

(65) Prior Publication Data

US 2016/0037911 A1 Feb. 11, 2016

Related U.S. Application Data

(63) Continuation of application No. 14/046,589, filed on Oct. 4, 2013, now Pat. No. 9,226,578, which is a
(Continued)

(51) Int. Cl.
*A47B 37/00* (2006.01)
*A47B 41/02* (2006.01)
(Continued)

(52) U.S. Cl.
CPC .............. *A47B 41/02* (2013.01); *A47B 19/02* (2013.01); *A47B 41/00* (2013.01); *A47B 41/06* (2013.01);
(Continued)

(58) Field of Classification Search
CPC ................................ A47B 41/02; A47B 19/02
(Continued)

(56) References Cited

U.S. PATENT DOCUMENTS

| 212,612 A | 2/1879 | Lorton |
| 1,207,702 A | 12/1916 | Bartholomew |

(Continued)

FOREIGN PATENT DOCUMENTS

| EP | 2062501 A1 | 5/2009 |
| FR | 2541941 A1 | 9/1984 |

OTHER PUBLICATIONS

PCT International Search Report and Written Opinion, PCT/US2013/027621, Jul. 19, 2013.
(Continued)

*Primary Examiner* — Jose V Chen
(74) *Attorney, Agent, or Firm* — Quarles & Brady LLP

(57) ABSTRACT

A table assembly comprising a top member forming a substantially flat top surface circumscribed by an outer edge and at least a first leg support member supporting the top member in a substantially horizontal position, a table dock secured to the top member and forming an elongated channel having a dock length dimension and at least a first display panel circumscribed by a panel edge and having at least one straight edge having a panel length dimension, the dock length dimension less than panel length dimension, wherein at least a portion of the straight edge of the panel is receivable within the dock channel with the panel extending out the open first and second ends of the channel to support the panel in a substantially upright orientation with at least a portion of the display panel extending to a height above the flat top surface.

18 Claims, 30 Drawing Sheets

Related U.S. Application Data continuation of application No. 14/007,770, filed as application No. PCT/US2013/027621 on Feb. 25, 2013, now Pat. No. 9,066,589.

(60) Provisional application No. 61/603,642, filed on Feb. 27, 2012.

(51) Int. Cl.

| | | |
|---|---|---|
| *G09B 19/00* | (2006.01) | |
| *A47B 41/00* | (2006.01) | |
| *A47B 41/06* | (2006.01) | |
| *A47B 83/00* | (2006.01) | |
| *A47B 81/00* | (2006.01) | |
| *A47B 83/04* | (2006.01) | |
| *A47B 19/02* | (2006.01) | |
| *A47B 17/06* | (2006.01) | |

(52) U.S. Cl.
CPC .............. *A47B 81/00* (2013.01); *A47B 83/00* (2013.01); *A47B 83/04* (2013.01); *G09B 19/00* (2013.01); *A47B 17/065* (2013.01); *A47B 2200/0071* (2013.01); *A47B 2200/0085* (2013.01); *A47B 2200/0088* (2013.01); *A47B 2200/12* (2013.01)

(58) Field of Classification Search
USPC ................ 108/50.01, 50.02, 27, 60, 61, 94; 248/441.1, 451, 460; 312/223.3
See application file for complete search history.

(56) References Cited

U.S. PATENT DOCUMENTS

| | | | |
|---|---|---|---|
| 1,563,381 A | | 12/1925 | Larmore |
| 1,653,657 A | * | 12/1927 | Pretsch ................ A47B 23/046 108/141 |
| 1,760,456 A | | 5/1930 | von Palmenberg |
| 1,770,942 A | | 7/1930 | Morris |
| 1,797,847 A | * | 3/1931 | Vandagriff ............. A47B 23/02 108/49 |
| 2,688,525 A | | 9/1954 | Lindstrom |
| 2,801,893 A | | 8/1957 | MacAleese |
| 2,942,924 A | | 6/1960 | Stangert |
| 2,970,874 A | | 2/1961 | Honeycutt et al. |
| 2,981,583 A | | 4/1961 | Eisenberg |
| 3,026,159 A | * | 3/1962 | Miller ...................... B25H 3/06 108/1 |
| 3,117,534 A | | 1/1964 | Martland |
| 3,181,920 A | | 5/1965 | Burr |
| 3,190,603 A | | 6/1965 | Finnemann |
| 3,477,760 A | | 11/1969 | Bue et al. |
| 3,487,874 A | | 1/1970 | Solo |
| 3,543,312 A | * | 12/1970 | Pofferi ................... A47B 23/02 108/49 |
| 3,680,177 A | | 8/1972 | Ginsberg |
| 3,818,609 A | | 6/1974 | Woolman |
| 3,868,021 A | | 2/1975 | Heinrich |
| 3,905,484 A | | 9/1975 | Dean et al. |
| 3,927,481 A | | 12/1975 | Safranek |
| 4,307,863 A | | 12/1981 | Patrigot |
| 4,314,700 A | | 2/1982 | Dylag |
| 4,645,163 A | | 2/1987 | Zovar |
| 4,667,919 A | | 5/1987 | Teague |
| 4,836,114 A | | 6/1989 | Cohen et al. |
| 4,852,500 A | * | 8/1989 | Ryburg ................. A47B 21/03 108/105 |
| 4,938,401 A | | 7/1990 | Weisbrodt et al. |
| 4,996,110 A | | 2/1991 | Tanuma et al. |
| 5,035,626 A | | 7/1991 | Persing |
| 5,103,741 A | | 4/1992 | Grund et al. |
| 5,301,477 A | | 4/1994 | Rellinger et al. |
| D349,731 S | | 8/1994 | Leveen et al. |
| 5,406,893 A | | 4/1995 | Burns |
| 5,568,773 A | * | 10/1996 | Hung ..................... A47B 21/00 108/50.01 |
| 5,609,112 A | | 3/1997 | Meyer et al. |
| 5,615,620 A | * | 4/1997 | Owen .................... A47B 23/04 108/150 |
| 5,626,478 A | | 5/1997 | Gatlin |
| D380,232 S | | 6/1997 | Egan et al. |
| 5,664,749 A | | 9/1997 | Kump et al. |
| 5,743,414 A | | 4/1998 | Baudino |
| 5,823,574 A | | 10/1998 | Sullins et al. |
| 5,845,587 A | * | 12/1998 | Ditonto ................. A47B 21/00 108/147 |
| 5,848,798 A | | 12/1998 | Halvorson, Jr. et al. |
| 5,890,782 A | | 4/1999 | Alberts |
| 5,901,937 A | | 5/1999 | Compeau et al. |
| 5,941,713 A | | 8/1999 | Wayner et al. |
| 6,006,678 A | | 12/1999 | Merit et al. |
| 6,041,720 A | | 3/2000 | Hardy |
| 6,213,191 B1 | | 4/2001 | Nitzsche |
| 6,231,023 B1 | | 5/2001 | Morton |
| 6,272,779 B1 | | 8/2001 | Seiber et al. |
| 6,298,794 B1 | * | 10/2001 | Brown ................... A47B 21/00 108/50.01 |
| 6,305,300 B1 | * | 10/2001 | Honea ................... B60N 3/005 108/1 |
| 6,330,945 B1 | | 12/2001 | Reimer |
| D456,182 S | | 4/2002 | Hamilton et al. |
| 6,382,745 B1 | | 5/2002 | Adkins |
| 6,386,500 B1 | | 5/2002 | Dainoff et al. |
| 6,533,019 B1 | | 3/2003 | King et al. |
| 6,571,498 B1 | | 6/2003 | Cyrluk |
| 6,647,652 B1 | | 11/2003 | Seiber et al. |
| 6,647,899 B1 | | 11/2003 | Lysien |
| 6,666,424 B2 | | 12/2003 | Richardson |
| 6,769,747 B2 | | 8/2004 | Chan et al. |
| 6,866,516 B2 | | 3/2005 | Smith et al. |
| 6,877,707 B1 | | 4/2005 | Jones et al. |
| 6,941,691 B2 | | 9/2005 | Arko et al. |
| 6,955,130 B2 | | 10/2005 | Phillips |
| D513,564 S | | 1/2006 | Nobles et al. |
| 7,029,079 B2 | * | 4/2006 | Holt ...................... A47B 21/00 108/50.01 |
| 7,032,523 B2 | | 4/2006 | Forslund, III et al. |
| D520,263 S | | 5/2006 | Nobles et al. |
| D520,562 S | | 5/2006 | Nash |
| D525,460 S | | 7/2006 | Nobles et al. |
| 7,178,469 B2 | * | 2/2007 | Goza .................. A47B 21/0314 108/50.01 |
| 7,325,343 B2 | | 2/2008 | Seiber et al. |
| 7,604,481 B2 | | 10/2009 | Owen et al. |
| 7,677,182 B2 | | 3/2010 | Mueller et al. |
| 7,857,277 B2 | | 12/2010 | Bertrand |
| 7,862,341 B2 | | 1/2011 | Durand et al. |
| 7,942,372 B2 | | 5/2011 | Koh |
| 7,966,949 B2 | * | 6/2011 | Willey ................... B60N 3/002 108/25 |
| 7,997,211 B2 | * | 8/2011 | Peterson ............... F16M 11/04 108/152 |
| 8,499,698 B2 | * | 8/2013 | Youngs .................. A47B 13/08 108/25 |
| 9,066,589 B2 | * | 6/2015 | Battey ..................... G09B 19/00 |
| 9,226,578 B2 | * | 1/2016 | Battey ..................... G09B 19/00 |
| 2002/0027358 A1 | | 3/2002 | Peppers |
| 2002/0095840 A1 | | 7/2002 | Seiber et al. |
| 2005/0034637 A1 | * | 2/2005 | Heimbrock ............ A47C 19/22 108/49 |
| 2005/0186552 A1 | | 8/2005 | Finneran |
| 2006/0016951 A1 | | 1/2006 | Nash et al. |
| 2006/0049125 A1 | | 3/2006 | Stowell |
| 2006/0117669 A1 | | 6/2006 | Baloga et al. |
| 2006/0156962 A1 | | 7/2006 | Holt |
| 2006/0237621 A1 | | 10/2006 | Wolff et al. |
| 2008/0187900 A1 | | 8/2008 | Hardt |
| 2008/0315734 A1 | | 12/2008 | Birsel et al. |
| 2010/0176266 A1 | | 7/2010 | Minkley et al. |

(56) References Cited

U.S. PATENT DOCUMENTS

2011/0042541 A1   2/2011   Spencer et al.
2011/0057087 A1   3/2011   Bertrand
2011/0297052 A1   12/2011  Martin et al.

OTHER PUBLICATIONS

PCT International Preliminary Report on Patentability, PCT/US2013/027621, Sep. 2, 2014.
European Patent Office, Extended European Search Report, Application No. 13754870, Sep. 24, 2015.

* cited by examiner

TABLE AND LECTERN FURNITURE SYSTEM

CROSS-REFERENCE TO RELATED APPLICATIONS

This application is a continuation of U.S. patent application Ser. No. 14/046,589 filed Oct. 4, 2013, which is a continuation of U.S. patent application Ser. No. 14/007,770, filed on Sep. 26, 2013, which is the National Stage of International Application No. PCT/US13/27621, filed on Feb. 25, 2013, which claims the benefit of U.S. Provisional Patent Application Ser. No. 61/603,642, filed Feb. 27, 2012, each of which are incorporated herein by reference in there entirety.

STATEMENT REGARDING FEDERALLY SPONSORED RESEARCH OR DEVELOPMENT

Not applicable.

BACKGROUND OF THE DISCLOSURE

The present disclosure relates to classroom configurations and furniture and more specifically to a furniture system that can be reconfigured in many different ways to foster interaction, sharing and cooperative learning as well as small group discussions.

Traditional classrooms have been designed to focus attention on one person, a teacher or instructor, typically located at the front of the classroom. Here, the idea has been to configure classrooms based on the premise that instructors teach and students learn and, while there may be some communication between instructors and individual students during teaching sessions (e.g., questions and answers, etc.), small group discussions were to occur outside the normal teaching session hours and communications from students during a teaching session were to flow through the instructor to other students.

To concentrate student attention on an instructor, instructor focused classrooms are typically equipped with a large blackboard or whiteboard along a front wall of a classroom space with large numbers of student chair/desk combinations or chair/table combinations arranged in rows and columns throughout the remainder of the space to orient students to face the instructor's whiteboard or the like. In some cases a lectern may be provided between the instructor's whiteboard and the students to support a teacher's presentation materials with the teacher generally in front of the students during a presentation.

In some cases chair/table combinations include tables or table and chair combinations that are permanently secured in place within a classroom. Permanently secured tables/chairs ensure an orderly appearance and also reduce the amount of noise from moving furniture during class sessions. In other cases tables and chairs are free standing and can be moved around within a classroom to be rearranged.

In at least some cases it has been recognized that in a classroom, in addition to a primary instructor, many students bring experiences, tools, knowledge and other resources to the classroom that can be shared with others to enhance the learning experience. Additional student experiences are particularly prevalent at the college level and above where many students have unique practical work and/or life experiences that relate to classroom topics from which all students and instructors can benefit.

While some students are comfortable sharing their experiences and thoughts in large classroom settings, others are not and instead prefer to share their experiences and thoughts in smaller groups. For instance, some students may simply be shy and not want to discuss their thoughts in front of a large group of peers. For this reason many education institutions have developed curriculum whereby large classroom groups are routinely broken into smaller groups (e.g., 2-5 students) to facilitate small group discussions or to work on small group projects or problems so that students that prefer to share in smaller groups have an opportunity to more fully participate in activities. In many cases after topics have been discussed in small groups, those small groups are then called on to share their thoughts and experiences with a larger group.

One way to present small group thoughts to a larger group is to have a representative of each small group present to the larger group. In some cases small group representatives may be called on to present thoughts via a whiteboard at the front of a classroom. While presentation via a large whiteboard works well for some students, again, others may be shy or self conscious about their hand writing and may therefore be uncomfortable being the representative for their small group.

In addition to being used for large group and small group activities, classrooms are often used for dyadic (i.e., one on one) or individual activities. For instance, during testing, students often work individually to complete their work. As another instance, when a lecture or small group activities are completed prior to the end of a class period, the remaining time may be used individually to get a head start on homework. As one other instance, after lecture and small group activities are completed, a teacher may hold dyadic conferences with students at a teacher's desk while other students work at their desks.

While some teachers like using a lectern to support and organize teaching materials, others like to move around in a classroom during a session to maintain student interest and to assume different vantage points. For instance, many teachers get right up in front of students at times without any lectern or table between the teachers and the students to more personally engage students in the materials being presented. At other times, after information has been presented via a large whiteboard or the like at the front of a classroom, a teacher may opt to stand off to the side of the whiteboard while discussing whiteboard information so that students can better view the information with minimal distraction from the teacher.

Thus, many large classroom spaces are used to facilitate many different types of activities during a class period. Various tools have been developed to help students and teachers work more effectively in their classroom activities. For instance, many classrooms are now equipped with moving tables and chairs that can easily be rearranged to best facilitate a teacher centric large group lecture, small group activities, dyadic activities and even individual activities. In addition, portable easels that support whiteboards have been developed that can be used by small groups to memorialize their thoughts to be shared with a large class group.

While known tools have solved some of the problems associated with multiuse classrooms, other problems still persist. For instance, even when tables are rearranged to accommodate small group activities, the resulting arrangements often leave small groups visually and audibly exposed to the larger group environment which can have a dampening effect on participation by less confident students. As another instance, even when a whiteboard is dedicated to a small group, some shy students will hesitate to get up and add information to the whiteboard which operates as a barrier to sharing information. As still one other instance, in many cases, while a whiteboard dedicated to a small group will help students in that small group memorialize their thinking, those whiteboards are not easily sharable with a larger class group. As one other instance, during testing and individual activities, students are often exposed within the large group space which can adversely affect a student's concentration and result in lower test scores. As another instance, while a teacher may prefer to move to different locations during a lecture, often times teachers feel a need to have access to their teaching materials at all times and therefore stay near a lectern that supports their materials which has an adverse affect on the results of the teacher's efforts to convey material. Here, one solution has been for teachers to hold their teaching materials (e.g., a book) while moving around but that solution can be physically burdensome on a teacher if used for longer than a few minutes.

BRIEF SUMMARY OF THE DISCLOSURE

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It has been recognized that relatively small whiteboards can be used in a classroom setting for expressing individual and small group thoughts as well as for quickly reconfiguring classroom space to facilitate various types of learning activities. To this end, small whiteboard panels may be used by individuals or small groups of students to capture and memorialize thoughts. In at least some cases the small whiteboard panels are sized so that they are suitable for a student to support in her lap while adding information to the panel surface in a semi-private manner.

After information is added to a whiteboard panel, the whiteboard panel can be supported by a table, an easel or other supporting structure for members of a small group or of a larger group to view. In addition, the tables can be fitted with structure to support one or more whiteboard panels in vertically upright positions to operate as space dividers that increase the sense of privacy within the larger space for individuals or small groups. For instance, two whiteboard panels may be supported by a student table on opposite sides of the portion of the table to be used by the student to facilitate individual student activities. As another instance, several panels may be supported along lateral edges of two tables with rear edges of the tables abutting to provide a four student space to facilitate a small group activity.

It has also been recognized that the relatively small whiteboard panels can be stored below student tables in an orderly fashion to eliminate clutter within a larger classroom. In at least some embodiments the whiteboard panels are hung below table tops along lateral edges of the tops.

It has further been recognized that a portable easel structure can be provided that can support a plurality of whiteboard panels for simultaneous viewing during teacher based or small or large group collaborative sessions. When panels are sized for individual use, the panels tend to be relatively small. A plurality of small panels can be viewed simultaneously in a fashion similar to sheets of paper from a flip chart and therefore a portable multi-panel supporting easel is advantageous.

Moreover, it has been recognized that a portable table/lectern assembly may be provided that can be used to support a teacher at many different locations and in many different positions during a class period. In this regard, at least some embodiments include a teacher table assembly that includes a horizontally supported table top and a lectern member or shelf that is supported above the table top for movement to various locations relative to the table top. Exemplary lectern member locations include locations where the lectern member is over a front edge of the table top and where the lectern member is over a rear edge of the table top. When the lectern member is over the front edge of the table top, a teacher can stand behind the lectern with the table assembly between the teacher and students while participating in activities. When the lectern member is over the rear edge of the table top, the lectern member can support teaching materials at a location where the teacher is out in front of the students as opposed to being behind the lectern. In at least some embodiments the lectern member can also be moved to a location above a side edge of the table top to support a teacher generally to the side of the top. In this position the teacher may want to be located to the side of information presented via a large whiteboard or the like at the front of a classroom. To further get out of the way of presented information, a teacher may move the entire teacher's table assembly to one side of the lecture space.

Consistent with the above comments, at least some embodiments of the disclosure include a furniture system for use in a classroom, the furniture system comprising a table assembly including a top member and at least a first leg support member, the top member forming a substantially flat top surface and circumscribed by an outer edge, the at least one leg support member supporting the top member in a substantially horizontal position, a table dock supported by the table assembly adjacent the top surface and forming a table dock channel that opens upwardly where the dock channel is unobstructed by the top member, at least a first substantially flat display panel including a display surface on at least a first of two oppositely facing and substantially parallel side surfaces, the panel circumscribed by a panel edge and an easel assembly spaced apart from the table assembly and including an easel coupler, wherein the panel edge is receivable within the table dock channel to support the display panel in a substantially vertical orientation adjacent the flat top surface and wherein the display panel is alternatively engageable with the easel coupler to be supported in a substantially vertical orientation spaced apart from the table assembly.

In at least some cases the table assembly further includes a table coupler mounted below the top member wherein the coupler is configured to releasably support the display panel in a storage position hanging substantially vertically downward below the top member. In some cases the top member has a substantially rectangular shape including a depth dimension and a length dimension and wherein the table coupler is located along a lateral edge portion of the outer edge that extends along the depth dimension so that the whiteboard panel extends downward below the lateral edge when in the storage position. In some cases the panel forms a handle opening adjacent a top edge portion of the panel edge and the table coupler includes at least a first substantially horizontal post that passes through the handle opening to support the display panel in the storage position.

In some cases the distal end of the substantially horizontal post is located below a bottom surface of the top member. In some cases the table dock is located adjacent a lateral edge portion of the outer edge and has a top edge that is at substantially the same height as the top surface. In some cases the table forms an opening in the top surface and wherein the table dock includes a grommet inserted in the opening that includes first and second substantially parallel and vertical dock wall members that extend upward from the top surface, the dock wall members forming the dock channel. In some cases both the easel assembly and the table assembly are mounted on wheels so that the assemblies can be moved about the classroom.

In some cases the panel forms a handle opening adjacent a top edge portion of the panel edge and the easel coupler includes at least a first substantially horizontal post that passes through the handle opening to support the display panel. In some cases the easel assembly includes a track mounted to a wall and wherein the horizontal post is mounted to the track for sliding motion there along. In some cases the easel assembly includes a frame and the easel coupler includes at least a first substantially horizontal track member supported by the frame, the track member forming at least a first upwardly opening track channel that grips a lower edge portion of a panel edge when a display panel is supported by the easel assembly.

In some cases the track member forms at least a second upwardly opening track channel that extends along the first track channel, the second track channel gripping a lower edge portion of a panel edge when a display panel is received therein so that panels may be supported by the track member in an overlapping orientation. In some cases the display panel has a substantially rectangular shape having perpendicular width and length dimensions and wherein the panel may be supported by each of the table dock and the track member with either of the depth width and the length dimension extending vertically.

Some cases further include a plurality of display panels wherein each display panel has a substantially rectangular shape having perpendicular panel width and panel length dimensions and wherein the track channel grips lower edge portions of at least two of the display panels to support the panels edge to edge. Some cases further include at least a second easel coupler including at least a second substantially horizontal track member supported by the frame, the track member forming at least a second upwardly opening track channel that grips a lower edge portion of a panel edge when a display panel is supported by the easel assembly.

In some cases the second track member is supported by the frame below the first track member. In some cases the display panel includes whiteboard material on the first and second oppositely facing side surfaces. In some cases the display panel includes a flat panel electronic display having a viewing surface on at least the first side surface.

Other embodiments include a furniture system for use in a classroom, the furniture system comprising a plurality of substantially flat display panels, each panel including a display surface on at least a first of first and second oppositely facing and substantially parallel side surfaces, each panel circumscribed by a panel edge, a table assembly including a top member and at least a first leg support member, the top member forming a substantially flat top surface and circumscribed by an outer edge, the at least one leg support member supporting the top member in a substantially horizontal position, at least a first table dock supported by the table assembly adjacent the top surface, the first table dock forming a first dock channel that opens upwardly where the dock channel is unobstructed by the top member, the dock channel having a width dimension so that when an edge portion of one of the panels is received within the dock channel, the dock channel grips the edge portion and supports the panel in a substantially vertical orientation adjacent the flat top surface and an easel assembly separate from the table assembly and including a frame and at least a first substantially horizontal track member supported by the frame, the track member forming at least a first upwardly opening track channel, the track channel having a width dimension so that when an edge portion of one of the panels is received within the track channel, the track channel grips the edge portion and supports the panel in a substantially vertical orientation.

Some embodiments further include second and third table docks supported by the table assembly adjacent the top surface, the second and third table docks forming second and third dock channels that open upwardly where the dock channels are unobstructed by the top member, each of the second and third dock channels having a width dimension so that when an edge portion of one of the panels is received within the dock channel, the dock channel grips the edge portion and supports the panel in a substantially vertical orientation adjacent the flat top surface. In some cases the easel assembly further includes at least a second substantially horizontal track member supported by the frame below the first track member, the second track member forming at least a second upwardly opening track channel, the second track channel having a width dimension so that when an edge portion of one of the panels is received within the second track channel, the second track channel grips the edge portion and supports the panel in a substantially vertical orientation below the first track channel.

In some cases each of the panels has a substantially rectangular shape having perpendicular width and length dimensions and wherein each of the first and second track members has a track length dimension that is greater than the length dimension of each of the panels so that each of the first and second track members can receive edge portions of at least two panels in an edge to edge orientation. In some cases each of the display panels includes whiteboard material on the first and second oppositely facing side surfaces. In some cases each of the display panels includes a flat panel electronic display having a viewing surface on at least the first side surface.

Some embodiments include a furniture system for use in a classroom, the furniture system comprising a plurality of substantially flat and substantially rectangular display panels, each panel including a display surface on at least one of first and second oppositely facing and substantially parallel side surfaces and having perpendicular panel width and length dimensions, each panel circumscribed by a panel edge, a table assembly including a top member and at least a first leg support member, the top member forming a substantially flat top surface and circumscribed by an outer edge, the at least one leg support member supporting the top member in a substantially horizontal position, at least a first table dock supported by the table assembly adjacent a portion of the outer edge of the top member, the first table dock forming a first dock channel that opens upwardly and extends along the adjacent portion of the outer edge of the top member where the dock channel is unobstructed by the top member, the dock channel having a width dimension so that when an edge portion of one of the panels is received within the dock channel, the dock channel grips the edge portion and supports the panel in a substantially vertical orientation adjacent the flat top surface and an easel assembly separate from the table assembly and including a frame and at least first and second substantially horizontal track members supported at first and second heights on a first side of frame, respectively, wherein the difference between the first and second heights is greater than each of the panel width and length dimensions, each of the track members forming at least a first upwardly opening track channel having a width dimension so that when an edge portion of one of a panel is received within the track channel, the track channel grips the edge portion and supports the panel in a substantially vertical orientation.

Still other embodiments include a lectern assembly comprising a table assembly including a top member and at least a first leg support member, the top member forming a substantially flat top surface at a first height and circumscribed by an outer edge that defines the boundaries of a space column disposed above the top surface, the top member including oppositely facing front and rear edge portions, the leg support member supporting the top member in a substantially horizontal position, a lectern support subassembly mounted to the table assembly and extending upward to an upper end at a second height above the first height, a substantially flat lectern member having oppositely facing top and bottom surfaces and circumscribed by a lectern member edge, the bottom surface of the lectern member supported at the upper end of the lectern support assembly for movement between a plurality of different juxtapositions including at least a first juxtaposition where at least a portion of the lectern member resides outside and to a front edge side of the space column and a second juxtaposition where at least a portion of the lectern member resides outside and to a rear edge side of the space column.

In some cases the lectern support subassembly includes an arm assembly having upper and lower ends, the lower end mounted to the top member for pivotal rotation about a first vertical axis, the upper end of the arm assembly at a second height above the first height, the bottom surface of the lectern member mounted to the distal end of the arm assembly for pivotal rotation about a second vertical axis that is spaced apart from the first vertical axis by the arm assembly, wherein the arm assembly pivots with respect to the first vertical axis and the lectern member pivots with respect to the second vertical axis to move the lectern member between the first and second juxtapositions. In some cases the edge of the lectern member includes oppositely facing front edge and rear edge portions and wherein the rear edge portion of the lectern member resides to a rear edge side of the space column when the lectern member is in the second juxtaposition and wherein the front edge portion of the lectern member resides to a front edge side of the space column when the lectern member is in the first juxtaposition.

In some cases the top member is substantially rectangular shaped and wherein the lectern member is substantially rectangular shaped. In some cases the proximal end of the arm assembly is mounted to the top member substantially midway between the front and rear edge portions of the table top edge. In some cases the top member edge further includes oppositely facing first and second lateral edge portions that extend between the front and rear edge portions and wherein the proximal end of the arm assembly is mounted to the top member adjacent the first lateral edge portion.

In some cases the arm assembly and lectern member may be positioned in at least a third juxtaposition where at least a portion of the lectern member resides outside and to a first lateral edge side of the space column. In some cases a notch is formed in the rear edge portion of the top member, the lectern assembly further including a shelf member supported by at least one of the leg support member and the top member within a space below the notch at a third height that is lower than the first height and wherein at least a portion of the lectern member resides above the shelf member when the lectern member is in the first juxtaposition. In some cases the second height is at least eight inches above the first height.

Some embodiments include a furniture configuration comprising a table assembly including a top member and a leg structure, the top member forming a substantially flat top surface and circumscribed by an outer edge, the leg structure supporting the top member in a substantially horizontal position at a first height, a first table dock supported by the table assembly adjacent the top surface and forming a table dock channel that opens upwardly that is unobstructed by the top member, at least a first substantially flat display panel having a display surface on at least a first of first and second oppositely facing and substantially parallel side surfaces, the panel circumscribed by a panel edge and a first storage coupler supported by the table assembly at a second height below the first height, the storage coupler configured to releasably receive the at least a first panel, wherein the display panel is positionable in at least a first use position with a portion of the panel edge gripped in the dock channel and the display panel extending vertically upward adjacent the top surface of the top member and a second storage position with the display panel engaged by the storage coupler and located below the top member and below the first height.

In some cases the panel forms a handle opening adjacent a side edge portion of the panel edge and wherein the storage coupler includes at least one substantially horizontal post located below an undersurface of the top member where the post passes through the handle opening to support the panel in the storage position. In some cases the horizontal post resides below the table dock, the assembly further including a second display panel, wherein when the first panel is gripped by the table dock, the second panel is engageable with the horizontal post to reside in the storage position substantially parallel to the first panel and below the first panel. In some cases the top member is substantially rectangular including front and rear edges and first and second lateral edges, the first table dock and first storage coupler located adjacent the first lateral edge, the assembly further including a second table dock and a second storage coupler located adjacent the second lateral edge, the assembly further including at least a second display panel grippable by the second table dock when in a use position and that engages with the second storage coupler when in a storage position below the top member.

Some embodiments further include at least a first central table dock mounted to the top member between and spaced apart from the first and second lateral edges, the central table dock including first and second wall members that extend upward from the first height and that form a third table dock for receiving and gripping an edge of a display panel. In some cases the display panel includes an electric flat panel display.

Still other embodiments include an easel assembly comprising a plurality of substantially flat and substantially rectangular display panels, each panel including a display surface on at least a first of two oppositely facing and substantially parallel side surfaces and having perpendicular panel width and length dimensions, each panel circumscribed by a panel edge, an easel frame structure, at least first and second track members supported on one side of the easel frame and extending substantially horizontally, the first track member supported at a height above the height of the second track member, the first and second track members forming first and second track channels, respectively, each of the channels dimensioned to grip an edge portion of a panel edge when a display panel is supported by an associated track member, the first and second track members spaced apart and juxtaposed such that when the first and second track members support first and second panels, respectively, the first surfaces of the first and second panels are substantially coplanar with the first panel located above the second panel.

In some cases each of the first and second track members has a length dimension that is greater than the width dimension of the panels so that each track member can support at least two panels in a side by side fashion. In some cases the length dimension of each of the track members is substantially twice the width dimension of one of the panels.

Some embodiments further include at least third and fourth track members supported on a second side of the easel frame opposite the first side and extending substantially horizontally, the third track member supported at a height above the height of the fourth track member, the third and fourth track members forming third and fourth track channels, respectively, each of the channels dimensioned to grip an edge portion of a panel edge when a display panel is supported by an associated track member, the third and fourth track members spaced apart and juxtaposed such that when the third and fourth track members support third and fourth panels, respectively, the first surfaces of the third and fourth panels are substantially coplanar with the third panel located above the fourth panel.

In some cases the first and second channel open upwardly. Some cases further include wheels mounted to the bottom of the easel frame. In some cases each of the first and second track members also forms a second channel that is parallel to the first channel for supporting additional panels that overlap the first and second panels.

The following description and annexed drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE DISCLOSURE

Figure 1:
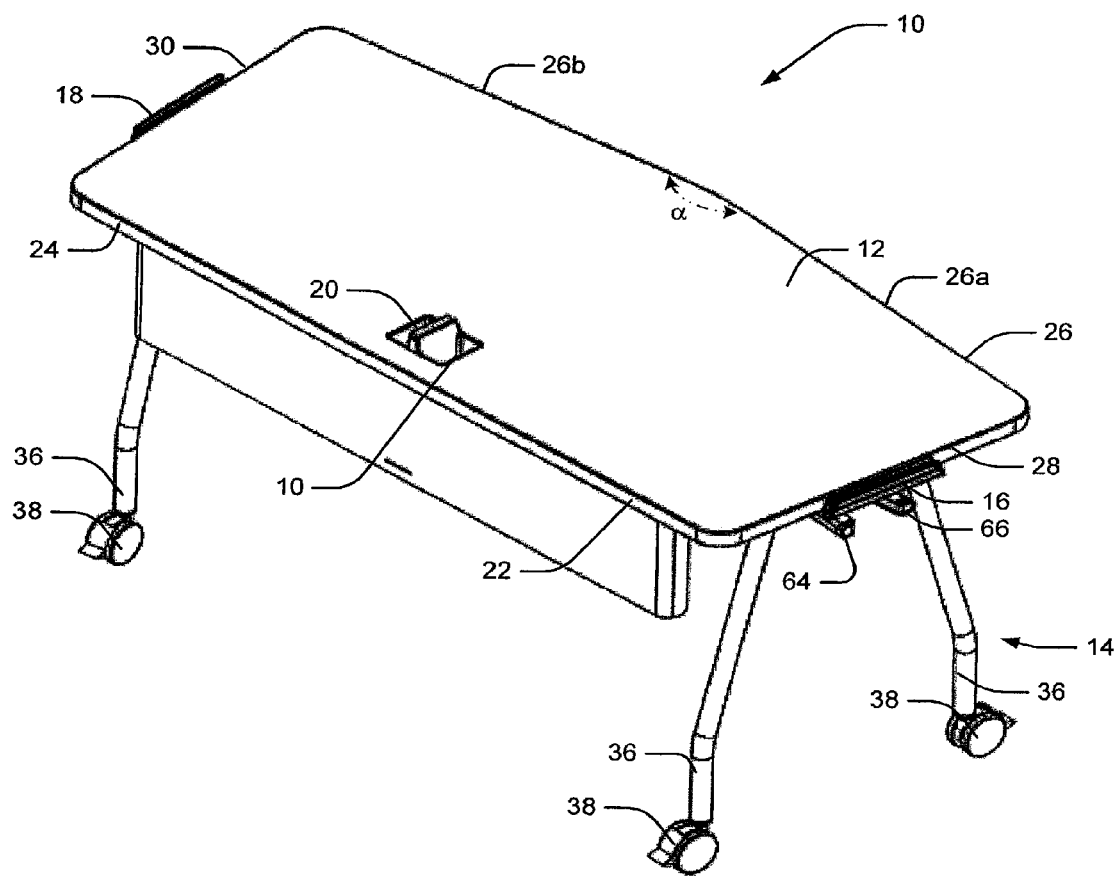
FIG. 1 is a perspective view of a student table assembly that includes various features that are consistent with at least some aspects of the present disclosure.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numbers correspond to similar elements throughout the several views and, more specifically, referring to FIGS. 1, 2 and 3, at least some aspects of the present disclosure will be described in the context of an exemplary student table assembly 10 that includes a table top member 12, a leg structure or subassembly 14, first and second side table dock assemblies 16 and 18, and a central table dock or central dock component 20. Table top member 12 includes an outer edge 22 that defines the top member shape which is generally rectangular and which more specifically includes a straight front edge portion 24, a rear edge portion 26 and first and second lateral side edge portions 28 and 30, respectively. Rear edge portion 26 generally faces in a direction opposite the front edge portion 24 and includes two equal length straight edge portions 26a and 26b that form an obtuse angle α there between that is convex outwardly. The angle α between portions 26a and 26b serves to softly delineate a boundary between two halves of top member 12 where each half is intended to be used by a single student. Thus, when a student approaches assembly 10 to use the table assembly, the student will naturally assume a position adjacent one of the straight edge portions 26a or 26b where the angle α will form a natural separation point.

Side edge portions 28 and 30 form identical and slightly obtuse angles with straight front edge portion 24 so that side edges 28 and 30 angle slightly toward each other when moving from rear edge 26 toward front edge 24. The angled side edges 28 and 30 operate to help students position a plurality of table assemblies 10 lateral edge to lateral edge to form an arc (see FIG. 13) about the location of a teacher during a large group lecture session where lateral edges of student tables are arranged adjacent and substantially parallel to each other. Top member 12 forms a central dock opening (not labeled) shown in FIG. 1 with central dock component 20 inserted centrally between lateral or side edge portions 28 and 30 and adjacent rear edge 24.

Exemplary leg subassembly or support member 14 includes four relatively simple elongated and rigid leg members 36 having casters or wheels 38 mounted at bottom ends where top ends are mounted via mechanical fasteners (e.g., screws) to the undersurface of top member 12, one leg member adjacent each of the four corners of member 12. The leg members 36 support top member 12 so that a top surface of member 12 is horizontal. Wheels 38 facilitate movement of assembly 12 within a classroom space so that assembly 10 and other similar assemblies can be rearranged to best suit various uses of the classroom space. At least one, and in at least some embodiments, each of the wheels 38 is equipped with a locking mechanism as well as a slightly tacky floor contact surface (e.g., rubber) so that the wheels can be locked to prevent the tables from inadvertently moving when bumped by a student after the tables are positioned as desired.

Figure 2:
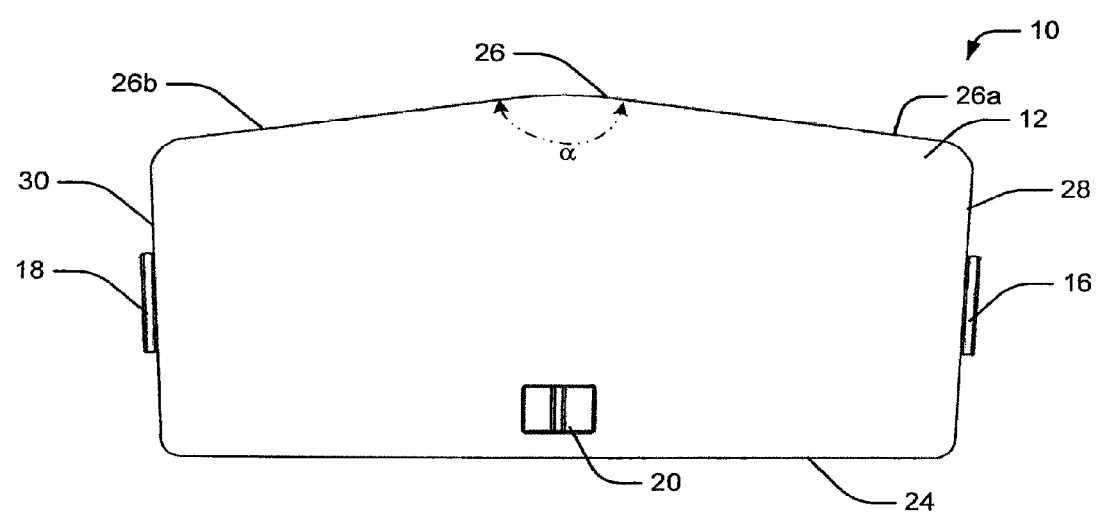
FIG. 2 is a top plan view of the table assembly shown in FIG. 1.
Figure 4:
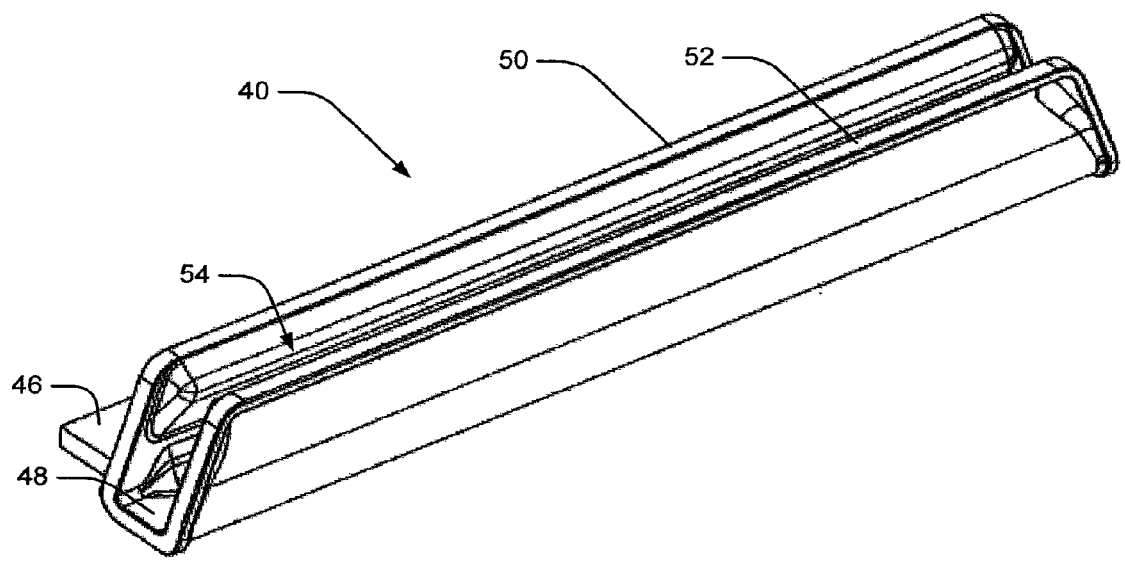
FIG. 4 is a perspective view of a side dock assembly shown along a side edge of the table shown in FIG. 1.
Figure 5:
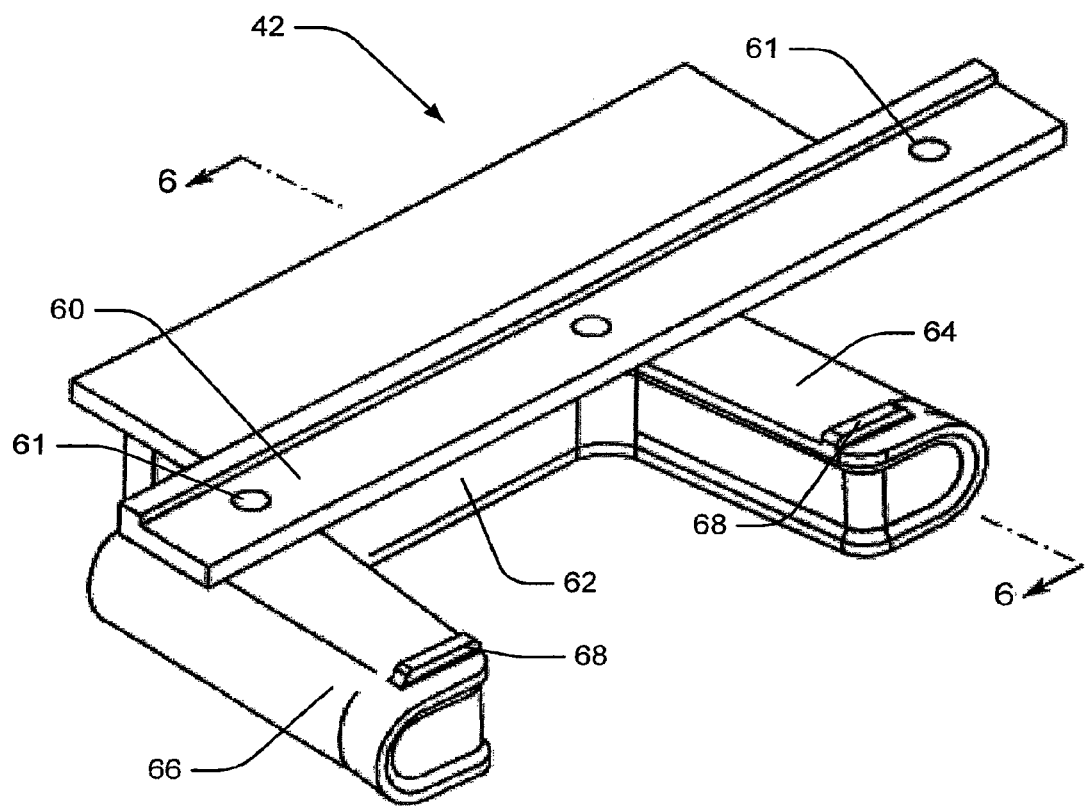
FIG. 5 is a perspective view of a coupler subassembly shown in FIGS. 1 and 3.

Referring still to FIGS. 1 and 2, each of side table dock assemblies 16 and 18 is similarly constructed and operates in a similar fashion and therefore, in the interest of simplifying this explanation, only assembly 16 will be described in detail. Referring also to FIGS. 4 and 5, assembly 16 includes a side table dock component or assembly 40 and a storage coupler component 42. In at least some embodiments each of components 40 and 42 is formed of molded polypropylene plastic or some other type of moldable resiliently deformable material. Other materials and other ways of forming components 40 and 42 are contemplated.

Figure 6:
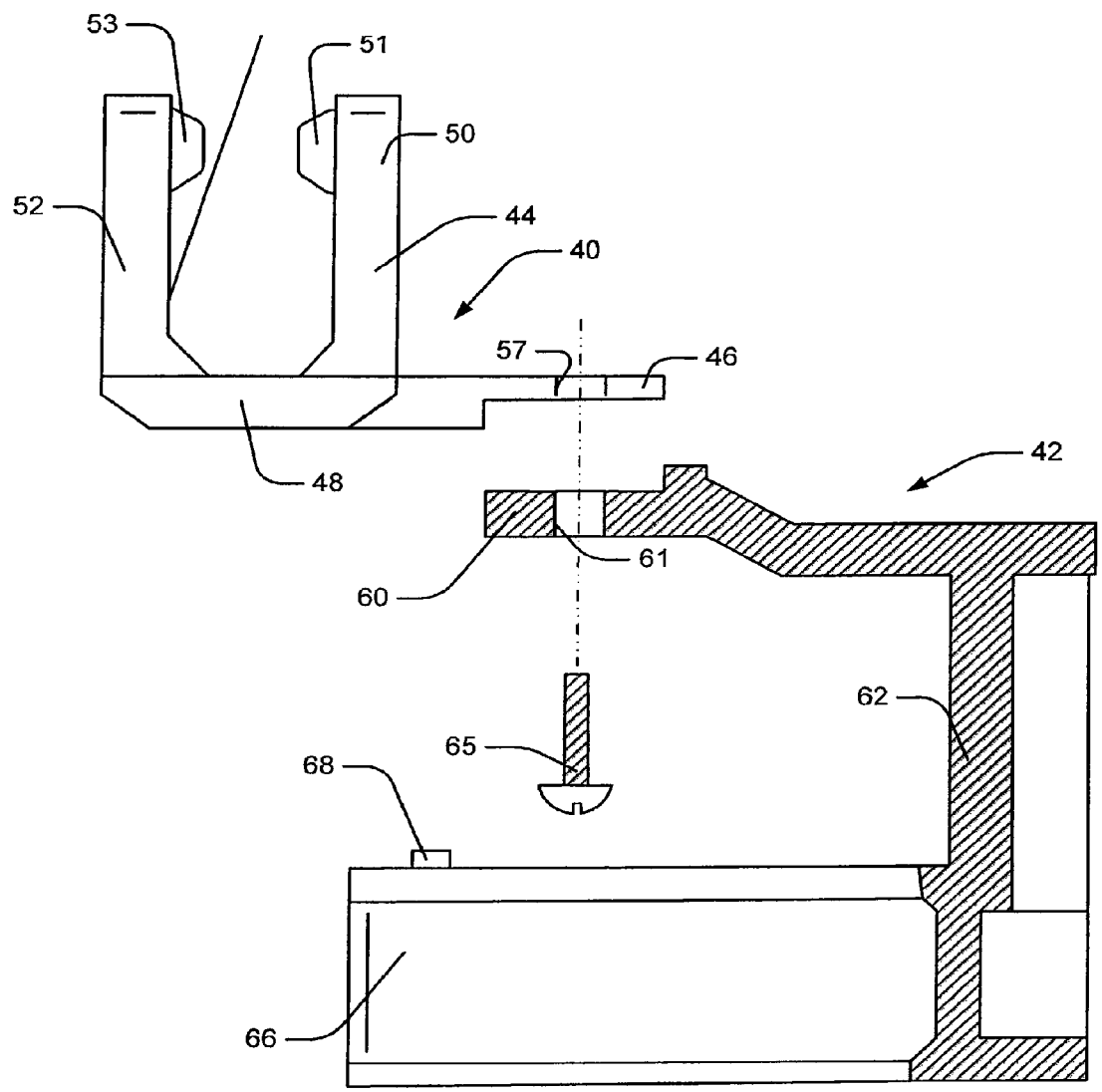
FIG. 6 is a partial cross sectional view showing the side dock assembly of FIG. 4 in end view along with the coupler subassembly of FIG. 5 in cross sectional view.

Dock component 40 includes a channel forming member 44 and a mounting flange 46. Channel forming member 44 includes a base wall member 48 and first and second lateral wall members 50 and 52 that extend upwardly from opposite long edges of base wall member 48 to form an elongated U-shaped channel 54 that is open at opposite ends. Referring also to FIG. 6, ribs 51 and 53 are formed on facing surfaces or wall members 50 and 52 near distal edges thereof that extend toward each other. Mounting flange 46 is integrally formed with channel forming member 44 and extends perpendicular to lateral wall member 50 and from the edge of wall member 50 that connects to base wall member 48. Flange 46 forms a plurality of mounting holes 57 for mounting dock component 40 to the undersurface of top member 12 as described hereafter.

Referring to FIGS. 5 and 6, storage coupler component 42 includes a mounting flange 60, a shoulder member 62 and first and second finger members 64 and 66 that are all integrally formed into a single member. Flange 60 is a generally flat member that forms a plurality of mounting holes 61 that are arranged in a pattern similar to the mounting holes 57 formed by flange 46 (see again FIG. 5) so that the holes in the two flanges 46 and 60 can be aligned during mounting. Shoulder member 62 is a flat rigid member that extends perpendicular to flange 60 and generally from one long edge thereof to a lower edge. Finger members 64 and 66 extend from opposite ends of and perpendicular to shoulder member 62 to the same side of shoulder member 62 as does flange 60. Each finger member 64 and 66 forms a rib 68 adjacent a distal end. Members 64 and 66 are spaced apart by a width that will accommodate the width of a normal size adult hand. For instance, in at least some cases finger members 64 and 66 are spaced apart approximately three to four inches.

Figure 3:
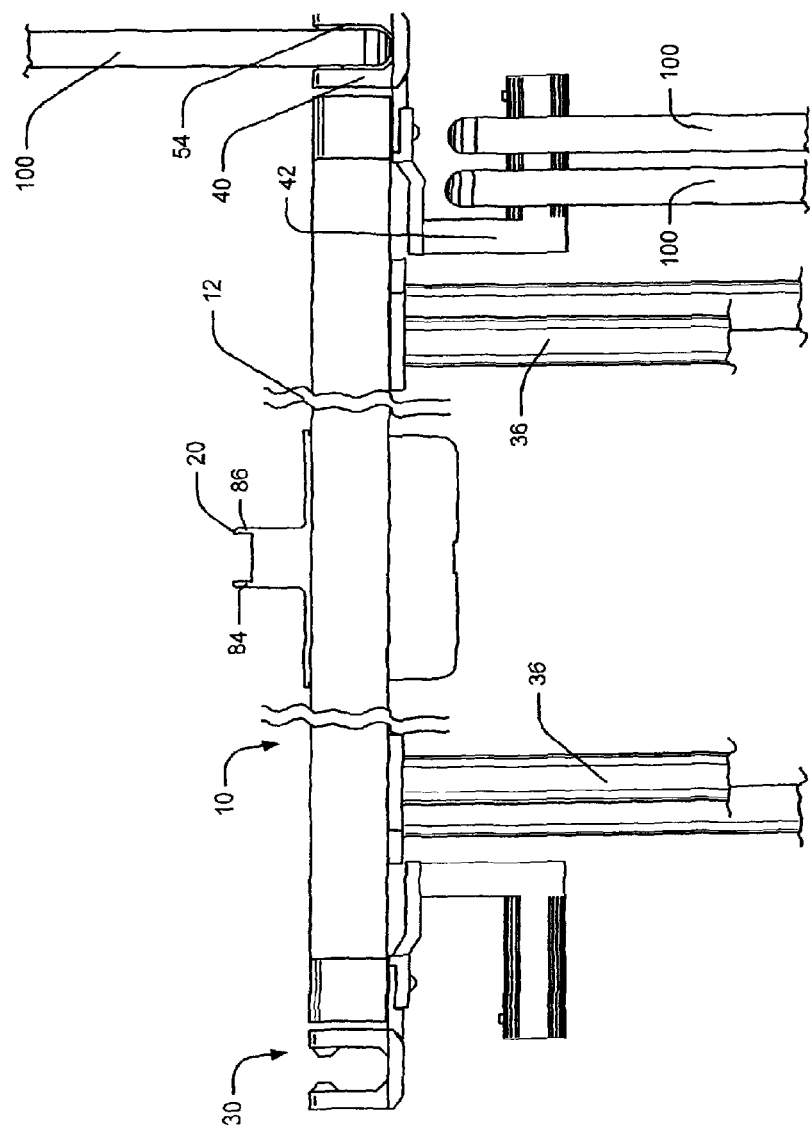
FIG. 3 is a front plan view of the table assembly shown in FIG. 1, albeit with two panels stored below a table top member and one panel supported along a lateral edge of the table assembly.

Referring to FIGS. 1 through 4 and FIG. 6, side dock component 40 may be mounted along an edge of top member 12 alone by using screws to mount flange 46 to the undersurface of member 12 with channel 54 adjacent one of the edges of member 12. In the illustrated embodiments component 40 is mounted adjacent a lateral side edge portion 28. In other embodiments the complete assembly including components 40 and 42 may be mounted together to the undersurface of member 12 adjacent an edge portion as best shown in FIG. 3. In this case, flange 60 is positioned below flange 46 with the hole patterns formed thereby aligned and screws 65 (see FIG. 6) are used to secure both components 40 and 42 to the undersurface of member 12. As shown in FIG. 3, when members 40 and 42 are mounted together, finger members 64 and 66 are spaced below the undersurface of top member 12 with ribs 68 extending upwardly. In addition, after assembly, the distal ends of finger members 64 and 66 stop short of the outer surfaces formed by components 40. Because distal ends of finger members 64 and 66 are inboard of the outer surfaces of components 40, the finger members from one table assembly 10 will not interfere with the finger members of an adjacent table assembly 12 when the table assemblies are placed closely side to side (see again FIG. 13).

Figure 7:
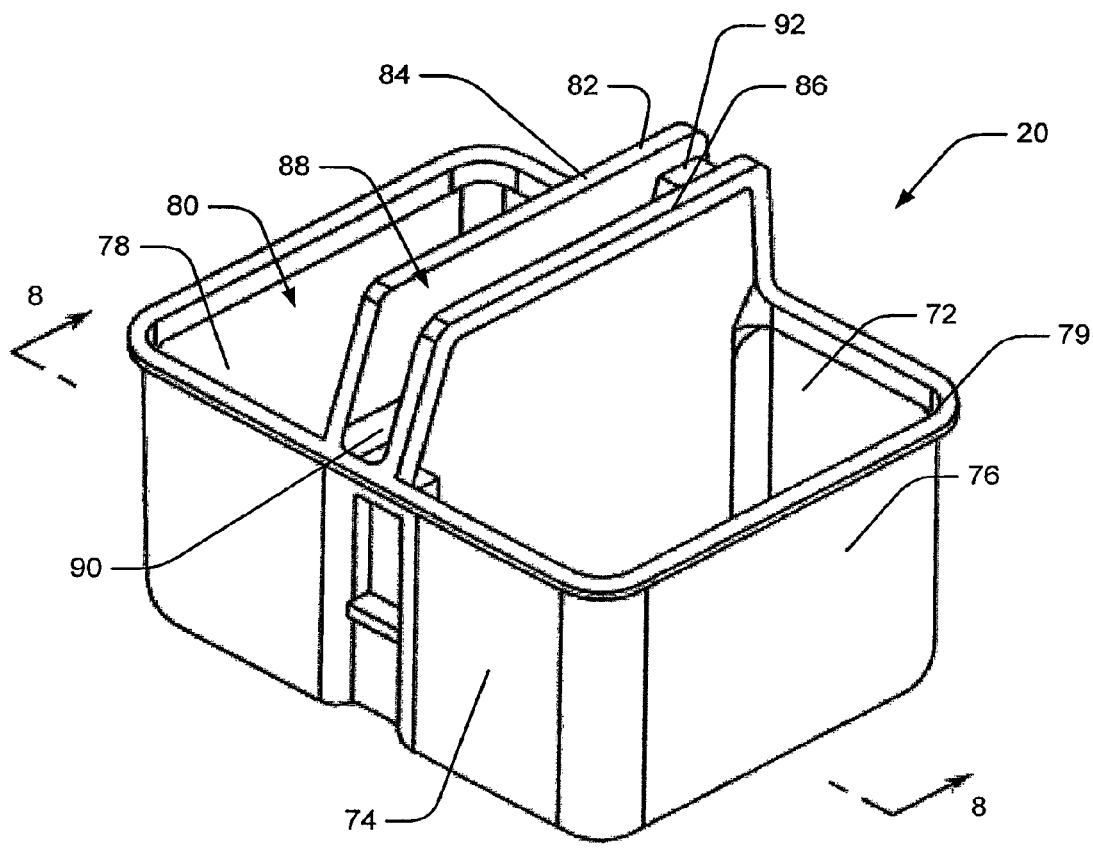
FIG. 7 is a perspective view of the central dock compartment shown in FIG. 1.
Figure 8:
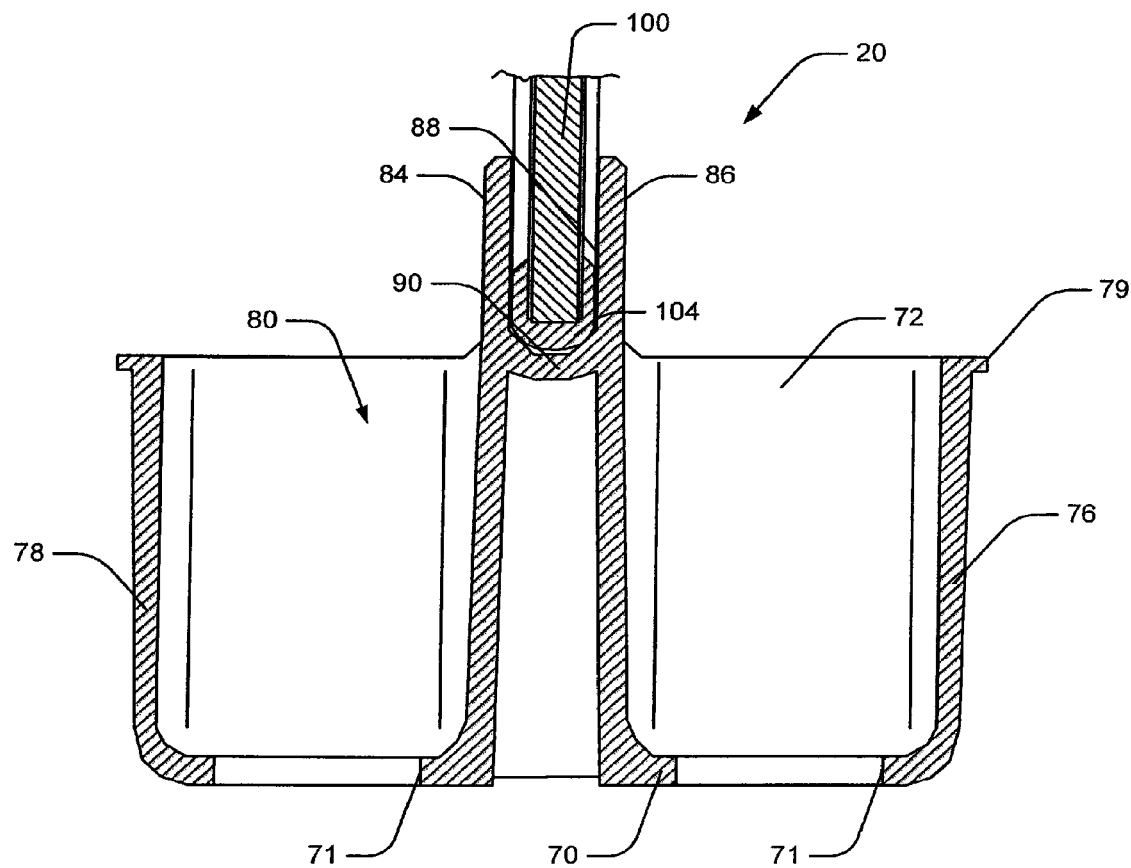
FIG. 8 is a cross sectional view taken along the line 8-8 in FIG. 7.

Referring again to FIGS. 1 and 3 and now also to FIGS. 7 and 8, central dock component 20 generally includes an integral molded structure including a bottom wall member 70, front and rear wall members 72 and 74 and first and second lateral wall members 76 and 78 that together define a three dimensional rectilinear space or cavity 80 where a central wall structure 82 divides the cavity 80 into first and second lateral halves. The lateral halves of the cavity are, in at least some embodiments, deep enough to receive and support pens, erasers or other accessories that can be used by a student occupying the table assembly 10. In at least some embodiments the cavity halves have dimensions to accommodate one or more different sizes of post it notes. Bottom wall member 70 may form slots 71 in some embodiments. Width and length dimensions of the molded structure are slightly smaller than the width and length dimensions of the central dock opening formed by top member 12. A rim 79 around the top edges of the front, rear and first and second lateral side walls extends outwardly past the dimensions of the central dock opening formed by top member 12. The central wall structure 82 includes first and second substantially parallel vertical wall members 84 and 86 that are spaced apart to form a receiving channel 88 as well as a horizontal base wall member 90 that extends between facing surfaces of wall members 84 and 86 at a level substantially flush with the top edges of wall members 72 through 78. An upper rear wall member 92 extends up from rear wall member 74 to close off the rear end of channel 88. Component 20 is mounted via a friction fit or via an adhesive within the central dock opening formed by top member 12 as seen in FIG. 1 with the channel 88 formed thereby opening upwardly and toward the front edge 26 of top member 12.

Figure 9:
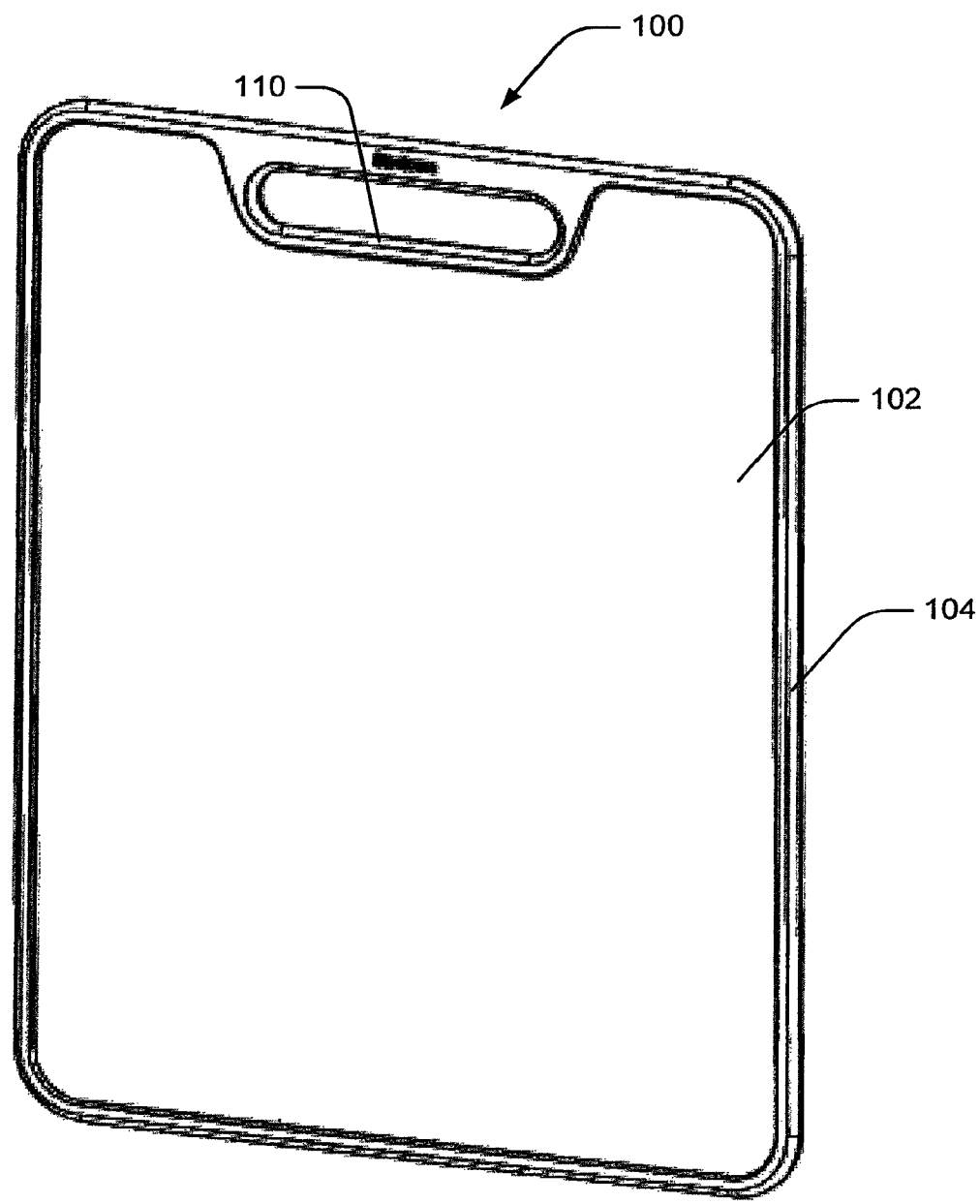
FIG. 9 is a perspective view of one of the panel subassemblies shown in FIG. 3 that is consistent with at least some aspects of the present disclosure.
Figure 11:
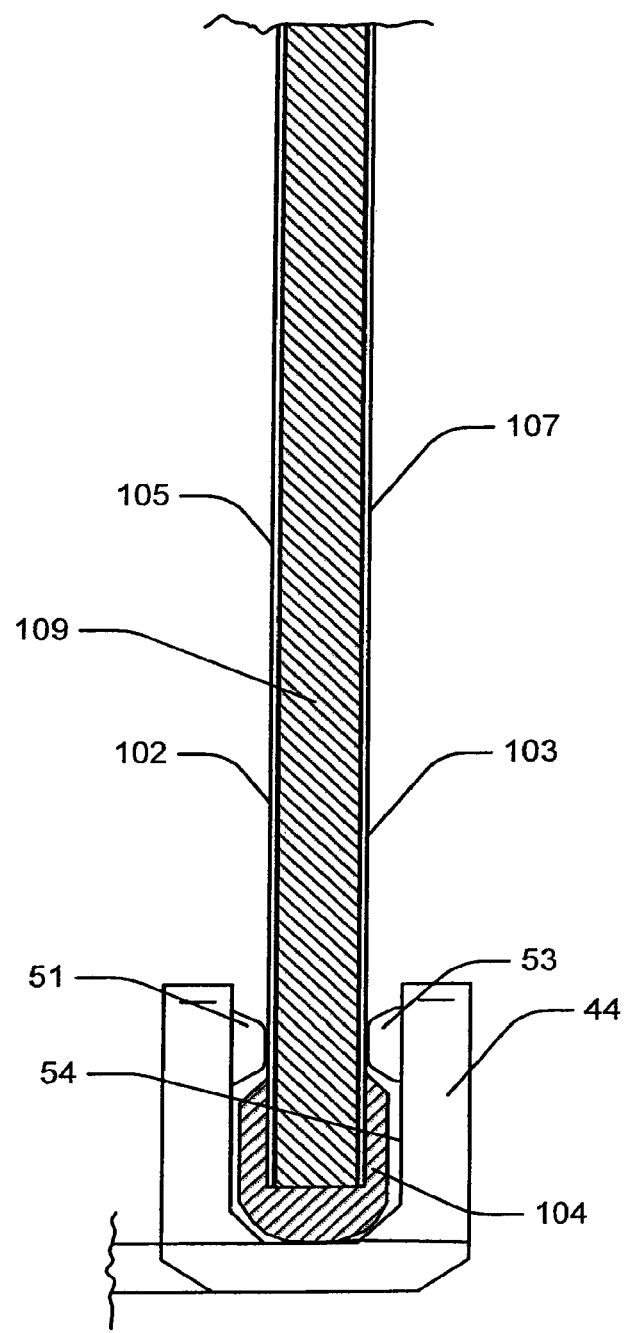
FIG. 11 is a partial cross sectional view taken along the line 11-11 in FIG. 10.

Referring to FIGS. 9 and 11, an exemplary panel assembly or panel 100 that is consistent with at least some embodiments of the present disclosure is illustrated. Panel 100 is generally a flat and rigid panel structure including first and second parallel and oppositely facing side surfaces 102 and 103 and a rim structure 104. The overall shape of panel 100 is rectangular having a length dimension that is longer than a width dimension. In at least some embodiments the length and width dimensions will be approximately 23 and 18 inches respectively, although other dimensions are contemplated. These dimensions have been determined to be relatively optimal for a person to use in their lap while adding information to a panel surface via a pen while at the same time being large enough for sharing information with others in a small or large group session. In other embodiments the length may be anywhere from 18 inches to 30 inches and the width may be anywhere from 14 to 24 inches.

Referring still to FIGS. 9 and 11, in at least some embodiments panel 100 includes a structural foam core 109 sandwiched between first and second thin layers of steel 105 and 107 where the outer surfaces of the steel layers are coated with a ceramic whiteboard material suitable for applying information via a pen or the like. The edge or rim structure 104 may be formed using many different resilient materials including but not limited to polypropylene plastic, rubber, etc.

Figure 10:
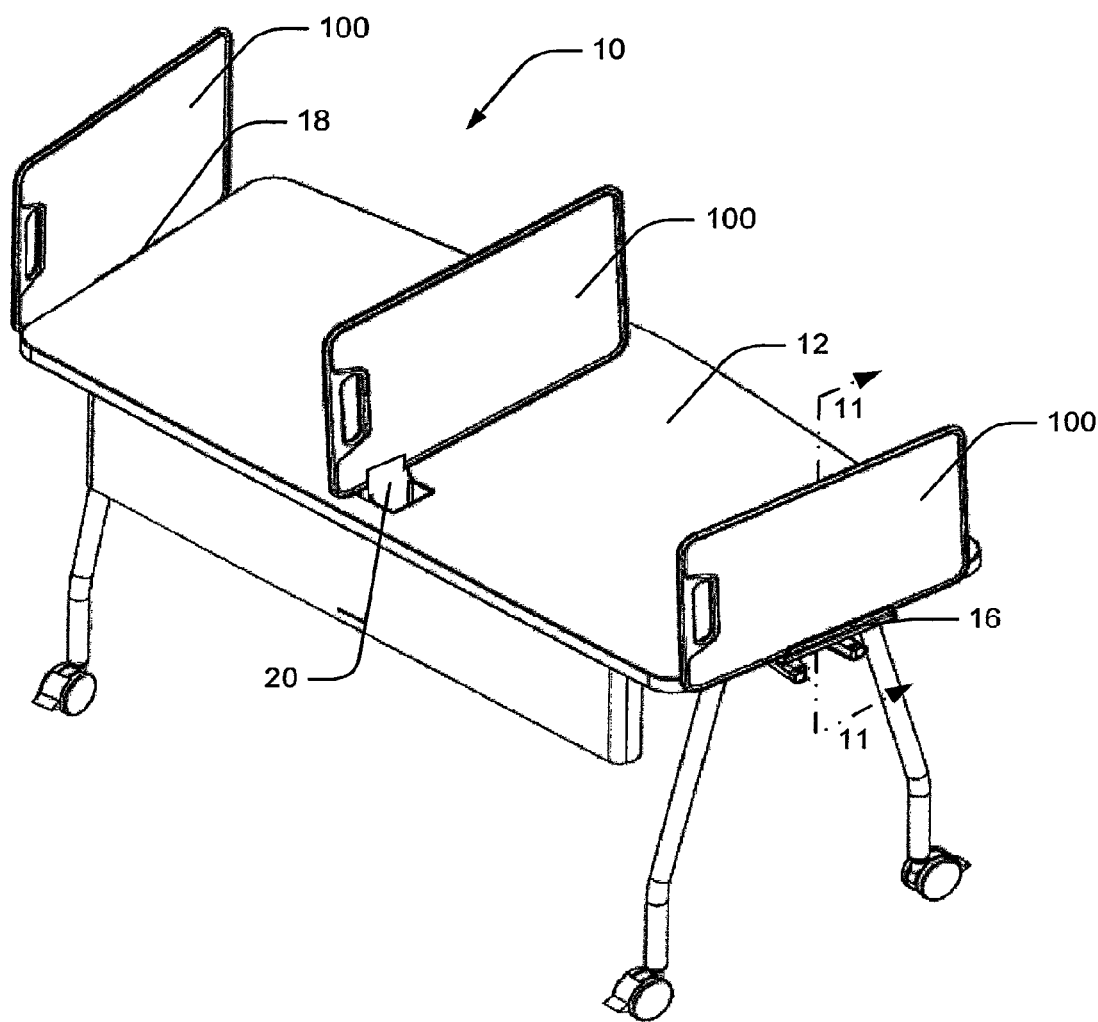
FIG. 10 is a perspective view showing three panels like the panel in FIG. 9 mounted to docks of the table shown in FIG. 1.

The rim or edge structure 104 is dimensioned to stand proud of the whiteboard surfaces 102 and 103 of the panel and to be tightly received in the channel 88 formed by the central dock 20 such that when they are fit into the channel 88, the channel operates to hold the panel 100 in a substantially vertical orientation as shown in FIG. 10. Referring to FIG. 11, the edge or rim structure 104 is dimensioned so that the rim is receivable in one of the channels 54 formed by one of the dock components 40 and a thickness dimension defined by the oppositely facing surfaces 102 and 103 is such that ribs 51 and 53 grip surfaces 102 and 103 to hold panel 100 in a vertical upright position as shown in FIG. 11. Because components 40 and 20 are formed of polypropylene plastic or some other resiliently deformable material, when a panel edge 104 is being inserted or removed from one of the channels 54 or 88, the channel forming walls flex outward to allow insertion or removal. After insertion of a panel, the channel forming walls form a frictional gripping force.

While FIG. 10 shows all of the exemplary panels 100 with their length dimensions arranged horizontally, it should be appreciated that any one or a subset or all of the panels 100 illustrated may also be supported by docks 16, 18 or 20 with their length dimensions extending vertically to facilitate a different affect.

Figure 12:
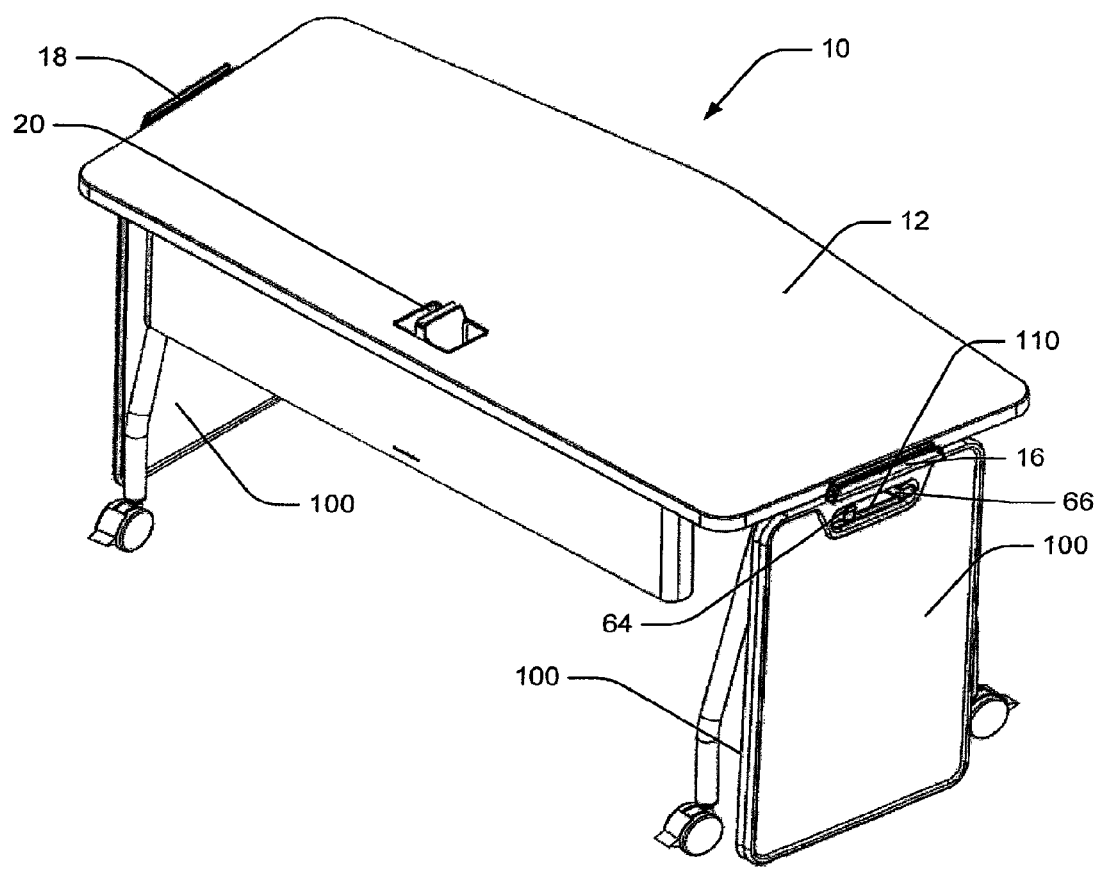
FIG. 12 is similar to FIG. 10, albeit showing three panels in storage positions coupled to coupling assemblies like the assembly shown in FIG. 5 below a table top member.

Referring again to FIG. 9, in at least some embodiments panel 100 forms a handle slot or opening 110 along one short edge which can be used to manipulate the panel with one hand. In at least some cases handle opening 110 is dimensioned so that, referring again to FIG. 3, finger members 64 and 66 can pass through the opening with the fingers located at different ends of the opening. When a panel 100 is to be stored, the panel 100 can be stored by passing the fingers 62 and 64 through the panel opening 110 and allowing the panel to hang down from the fingers generally below a lateral edge of the top member 12 as best shown in FIGS. 3 and 12. When properly hung, the handle opening 110 should be inboard of the finger member ribs 68 (see FIG. 3) so that the ribs 68 function to inhibit stored panels sliding off the distal ends of the finger members.

In at least some embodiments the finger members 62 and 64 have a length dimension so that they can extend through two or more handle openings 110 so that two or more panels 100 can be optionally hung for storage at the same time (see the two panels hung on the right side of the images in FIGS. 3 and 12).

After one or more panels are hung from a pair of the finger members 62/64, one of the stored panels can be easily removed using a single hand. To this end, to remove a stored panel, a person simply places his fingers in the space between finger members 62 and 64 and pulls slightly upward and outward at the same time to lift and remove the panel 100 from the finger members.

Figure 13:
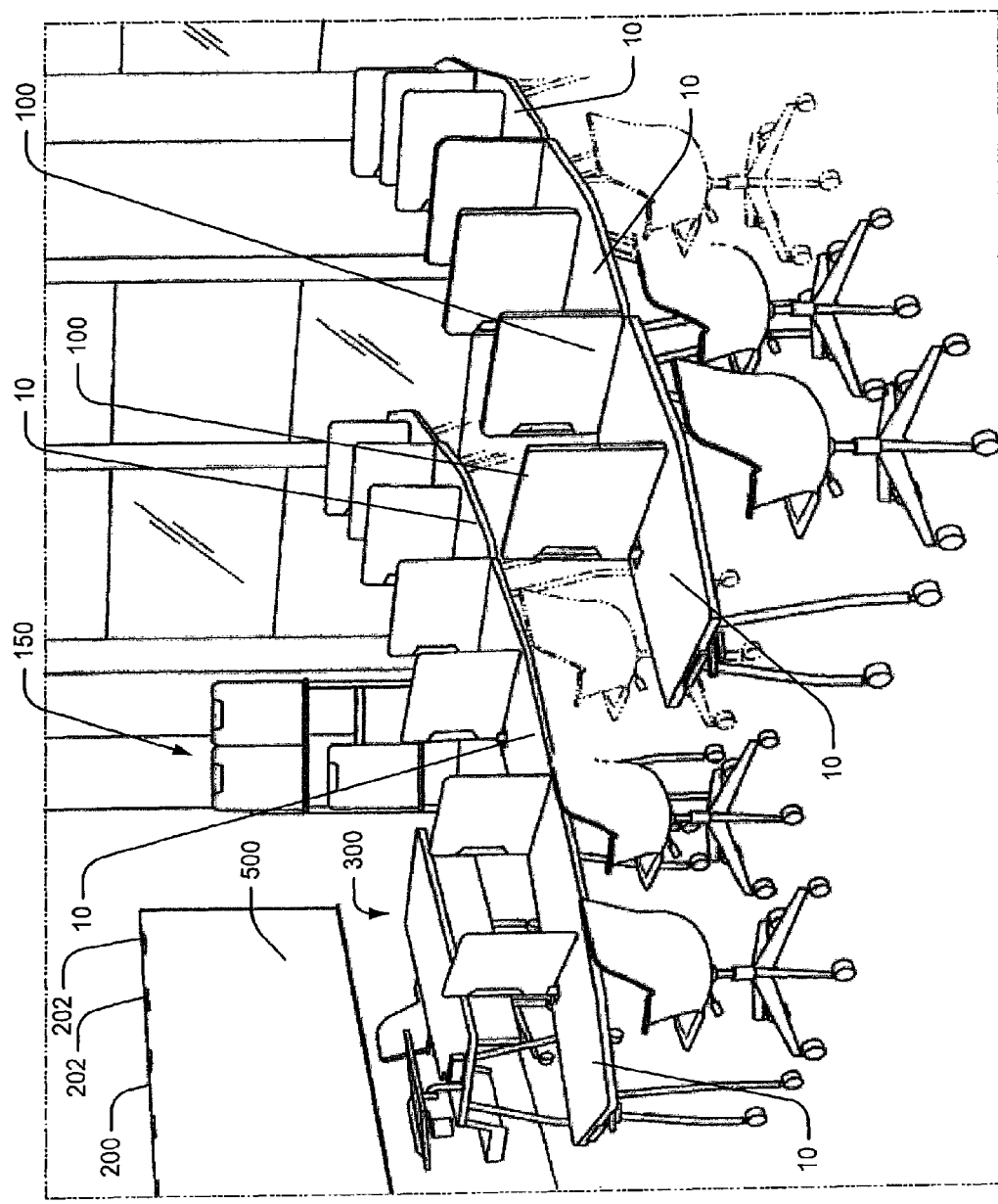
FIG. 13 is a perspective view of a class room space with a plurality of the table assemblies shown in FIG. 1 arranged in a lecture formation which also shows an easel assembly, a wall mounted panel support assembly and a lectern/table assembly that are consistent with additional aspects of the present disclosure.

Referring to FIG. 13, a plurality of the table assemblies 10 described above with respect to FIGS. 1 through 12 can be arranged side edge to side edge to form arcs about a teacher's lectern/table assembly 300 to facilitate a large group session. During a large group session, panels 100 may be stored as shown in FIG. 12. During individual testing or individual work sessions, panels 100 may be mounted as illustrated in FIG. 13 to separate work surface space for individual students.

Figure 14:
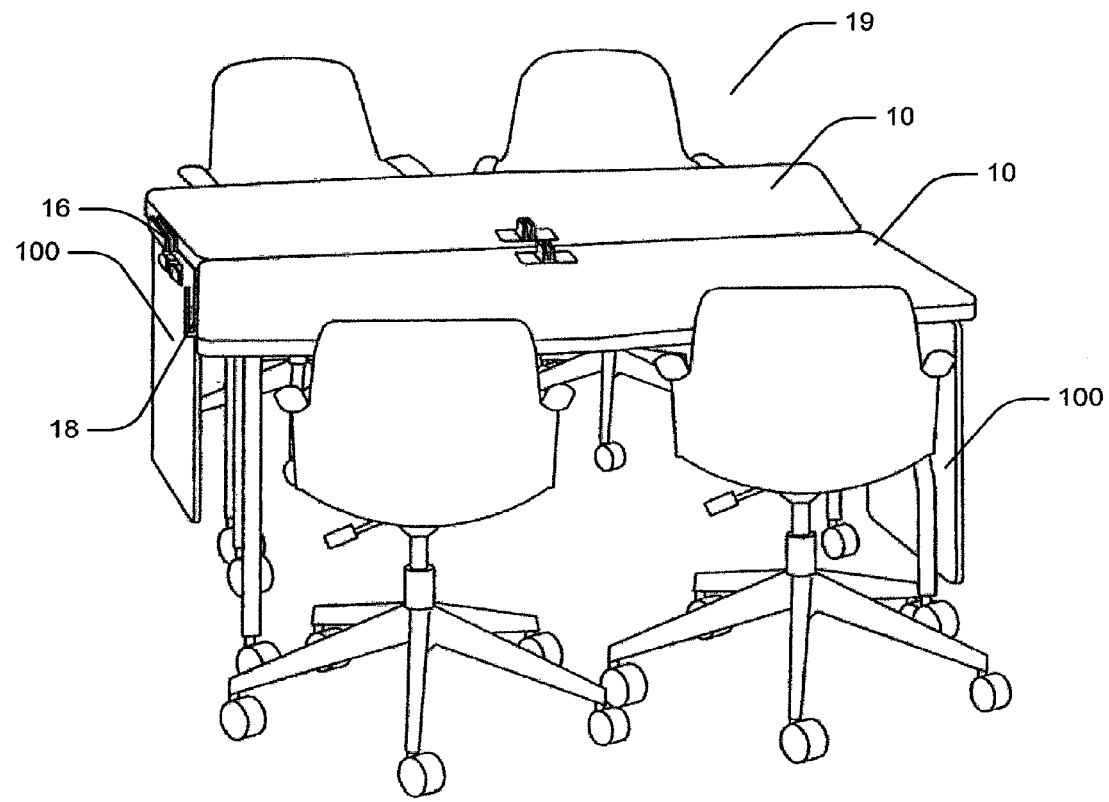
FIG. 14 is a perspective view showing two table assemblies like the assembly in FIG. 1 with their front edges abutting each other to form a small group discussion configuration.

Referring to FIG. 14, the table assemblies of FIG. 13 can also be easily and quickly rearranged to form small group work spaces 99 within the larger classroom space. In FIG. 14, two table assemblies 10 have been arranged with front edges abutting for use by four students arranged about oppositely facing rear edges of the assemblies. While panels 100 are shown in storage positions below table top members, the panels 100 may also be removed and mounted to the side docks 16, 18 on either side of the arrangement to cause a greater sense of privacy for students using the arrangement.

In addition, the panels 100 may be used by one or more students in the small group to present or memorialize information developed by the small group. In this regard, a student may support a panel on the top surface of assembly 10 while adding information or may hold the panel in her lap. After information is added to a plurality of panels, the panels may be mounted to the docks to facilitate further discussion. In some cases four panels with applied information may be mounted in a four pack along one side edge of the FIG. 14 arrangement with two portrait oriented panels in the storage positions below the table tops and two of the panels received in side docks, also in portrait orientations. Many other table assembly arrangements are contemplated.

Figure 15:
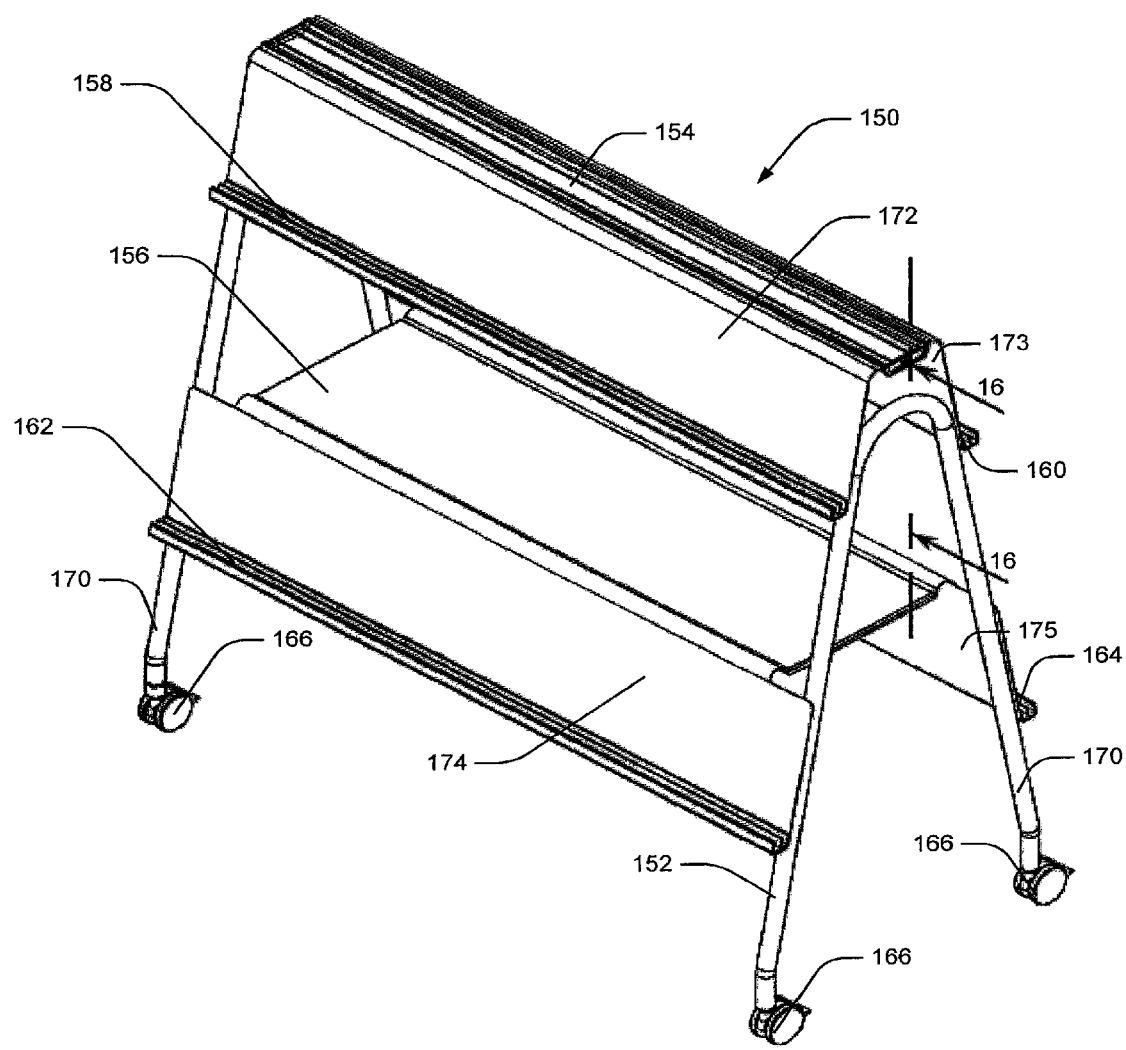
FIG. 15 is a perspective view showing an easel assembly that is consistent with at least some aspects of the present disclosure.
Figure 16:
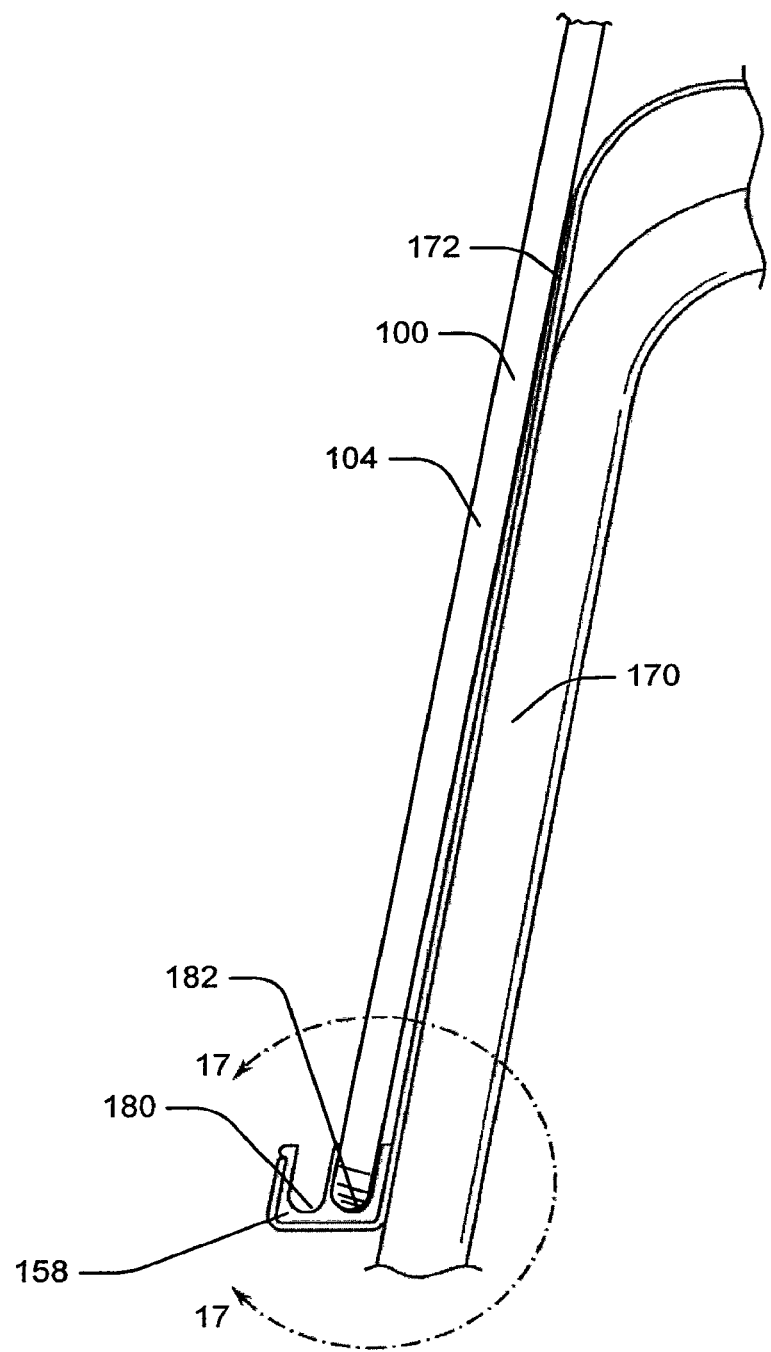
FIG. 16 is a partial side view of the easel assembly in FIG. 15, albeit with one of the panel assemblies of FIG. 9 supported thereby.

Referring again to FIG. 13 and now also to FIGS. 15 and 16, another assembly that is consistent with at least some embodiments of the present disclosure includes an easel assembly 150. Easel assembly 150 includes a frame structure 152, an accessory trough member 154, a shelf member 156, first and second upper rail members 158 and 160, respectively, first and second lower rail members 162 and 164, respectively, and a plurality of wheels or casters 166. Frame structure 152 includes two A-frame end members 170 and four angled planar support members 172 through 175. In the illustrated embodiment, the A-frame members 170 are each formed of bent and rigid tubing where lower ends of the A-frame members 170 are supported by wheels 170. As in the case of the table assemblies described above, wheels 166 may each include a locking mechanisms as well as somewhat tacky floor contacting surfaces.

The support members 172 through 175 are each formed of rigid sheet metal and traverse the distance between the A-frame end members 170 to space those members apart. Support member 172 and support member 174 are mounted to one side of the end members 170 with member 172 above member 174. Similarly, support member 173 and support member 175 are mounted to the other side of the end members 170 with member 173 above member 175. The members 172 through 175 may be secured to end members 170 via welding, mechanical fasteners (e.g., screws, bolts, rivets, etc.), or in any other fashion used in the furniture industry. Once members 172 through 175 are mounted to end members 170, each of members 172 through 175 forms a planar surface that faces outwardly from assembly 150 and that extends along a horizontal length dimension of assembly 150.

Referring still to FIG. 15, accessory trough member 154 is supported along the top edges of members 172 and 173 and forms a horizontal upper channel or trough that is designed to receive and hold whiteboard accessories such as pens, erasers, etc. Shelf member 156 is supported along top edges of members 174 and 175 and forms a generally flat horizontal top surface which can be used to store papers or class room accessories. In at least some embodiments top support members 172 and 173 and trough member 154 may be formed integrally out of a bent piece of sheet metal to minimize manufacturing costs as well as component count. Similarly, in at least some embodiments bottom support members 174 and 175 and shelf member 154 may be integrally formed out of bent sheet metal to minimize costs.

Figure 17:
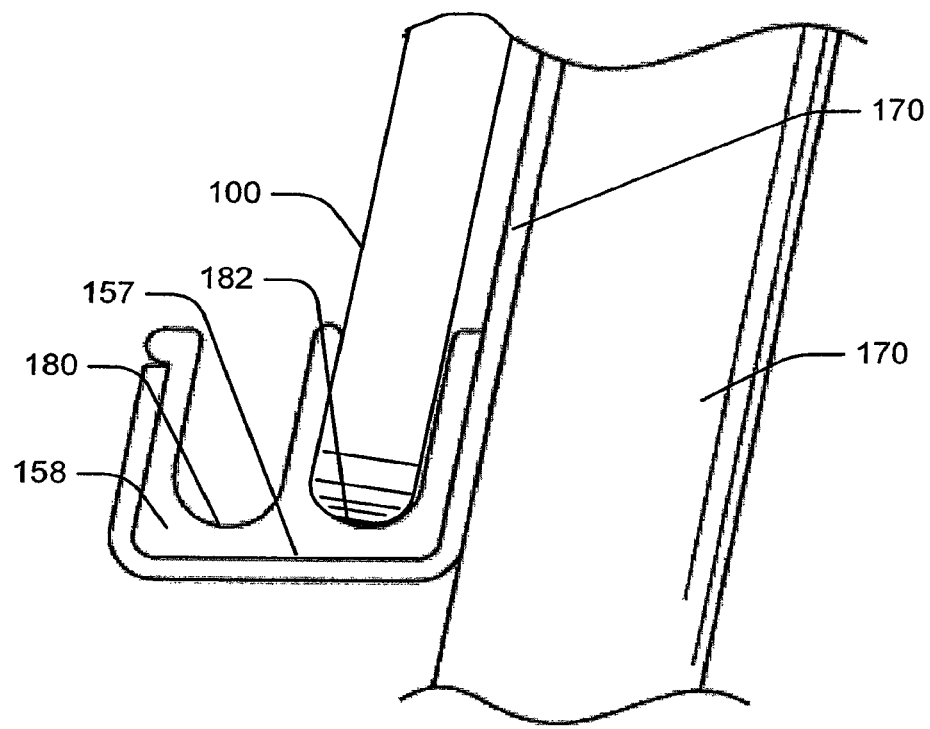
FIG. 17 is a closer view of the rail of FIG. 16 with a panel supported thereby.

Referring again to FIG. 15, each of the rail members 158, 160, 162 and 164 is similarly constructed and operates in a similar fashion and therefore, in the interest of simplifying this explanation, only rail member 158 will be described in detail. Referring also to FIGS. 16 and 17, exemplary rail 158 includes an elongated rigid and extruded member including fingers (not labeled) that extend upwardly to form first and second upwardly opening parallel channels 180 and 182, respectively along the entire length of rail member 158. The channels 180 and 182 have identical dimensions and features in at least some embodiments and are designed to receive and grip an edge portion 104 of a one of the panels 100 described above. In this regard, rail 158 is formed of somewhat flexible and resilient polypropylene molded so that each channel 180 and 182 has a width dimension that is similar to a width dimension defined by rim or edge 104 of a panel 100 as described above. In some embodiments the channel widths are formed such that when a panel rim 104 is received therein, the panel can be slid along the channel to different locations there along. Each channel 180 and 182 has a depth dimension designed such that when a panel 100 is received therein, an upper portion of the panel will not easily tip away from the support member 172. The rearward tilt of the A-frame members 170 and 172 also helps to maintain panels 100 within the channels 180 and 182.

Referring still to FIGS. 16 and 17, rail member 158 is mounted to A-frame end members 170 along a lower edge of support member 172. In at least some embodiments, support member 172 is bent along a lower edge to form an upwardly opening channel 157 along its length which is dimensioned to receive rail 158 and to retain the rail 158 via a friction fit or via mechanical fasteners (not illustrated). Although not shown, in some embodiments, ribs akin to ribs 51 and 53 (see again FIG. 6) formed by component 40 may be formed by rail member 158 to increase the gripping force on received panels 100. Similarly, rail members 160, 162 and 164 are mounted to A-frame end members 170 along lower edges of support members 173, 174 and 175, respectively.

Figure 18:
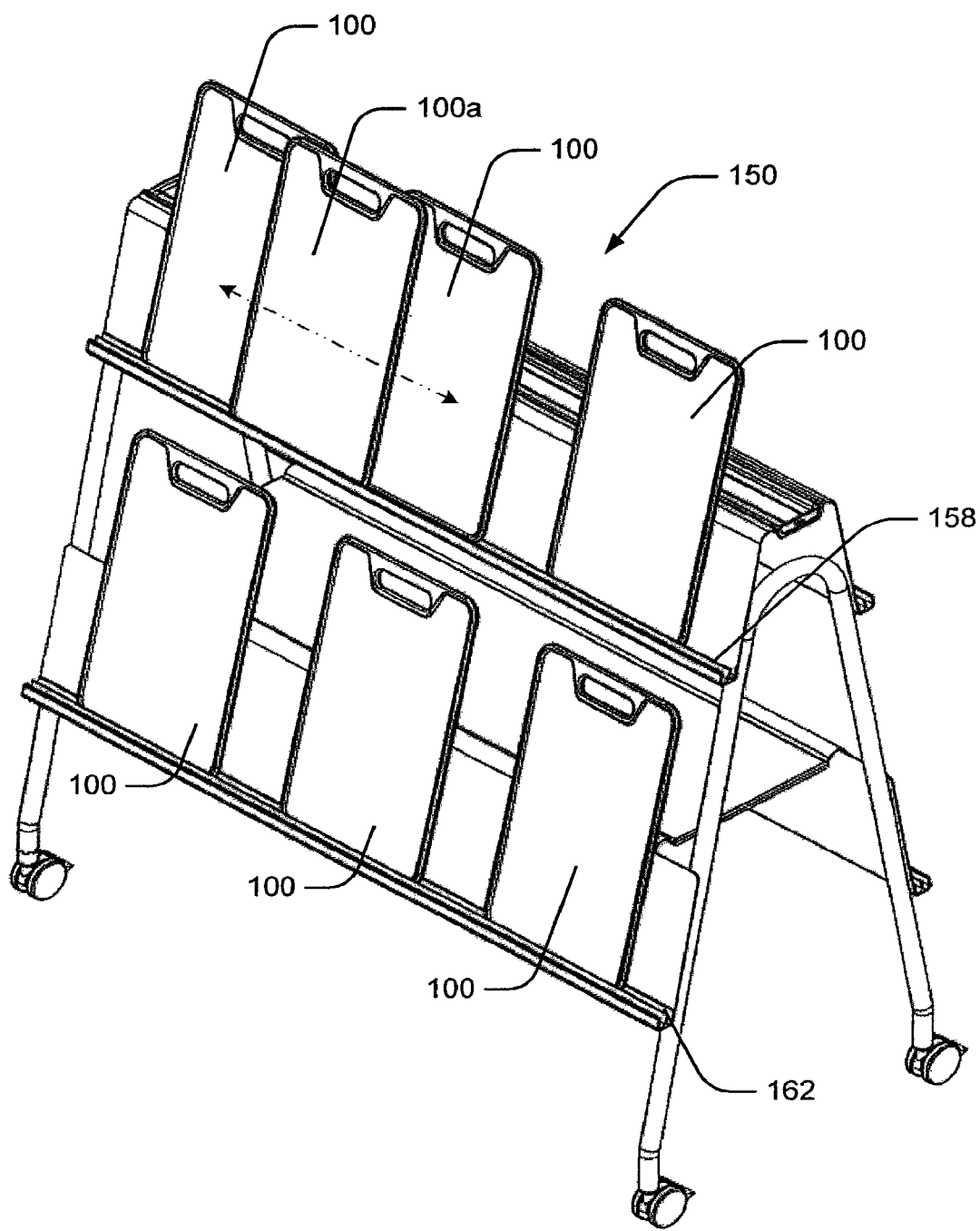
FIG. 18 is similar to FIG. 15, albeit where a plurality of panel assemblies are supported by the easel assembly.

Rails 158 and 162 are spaced apart a distance greater than the length dimension of one of the panels 100 to be used with easel assembly 150 (see FIG. 18). Rails 160 and 164 are spaced apart in a similar arrangement in the embodiment illustrated in FIGS. 15 and 18. In some embodiments the rails will have a length dimension that is a multiple of the width dimension of the panels while in other embodiments the rail lengths may be generally unrelated to the panel dimensions.

In at least some embodiments the rail channels will be mechanically closed off at their ends so that panels 100 cannot be slid out of the channels 180 and 182 at the rail ends. In other embodiments, as shown in FIG. 19, the channels 180 and 182 will be open at the rail ends so that panels 100 partially received in the channels can cantilever out there from to the sides of the assembly 150 if necessary.

Figure 19:
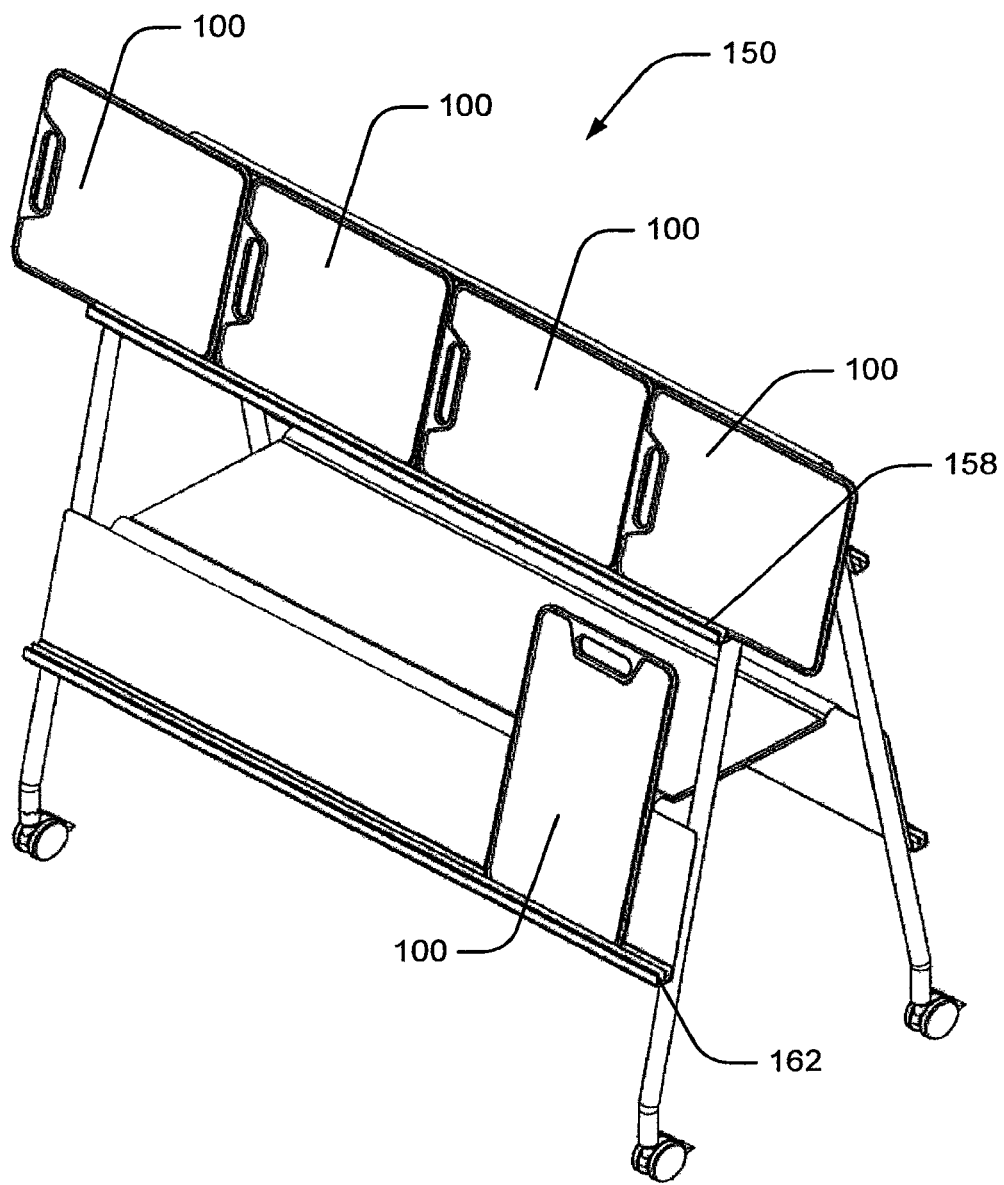
FIG. 19 is similar to FIG. 18, albeit where panels are supported in a different relative juxtaposition.

Referring to FIGS. 18 and 19, different numbers of panels 100 may be supported by assembly 150 with panels received in the channels of one, a subset or all of the rail members. When a panel is supported by rail 158, a lower edge of the rim 104 is received in one of the rail channels and the panel angles back toward the support member 172 in a generally vertical orientation. To remove a panel from rail 158, a student or teacher simply grasps the panel and lifts upward until the lower rim portion of the panel is unseated from the channel. In the alternative, where the rail ends are open, a panel may be slid out of the channel at either end of the rail.

Panels 100 may be supported on the rail members in either portrait or landscape orientations or combinations thereof. Moreover, because each rail forms two parallel channels 180 and 182, two layers of panels may be supported by a single rail (see panel 100a and panels 100 on the top rail 158 in FIG. 18). In at least some embodiments each of the exterior surfaces of support members 172 through 175 is coated with a whiteboard enamel material so that the broad surfaces can be used as additional whiteboard surfaces.

Figure 20:
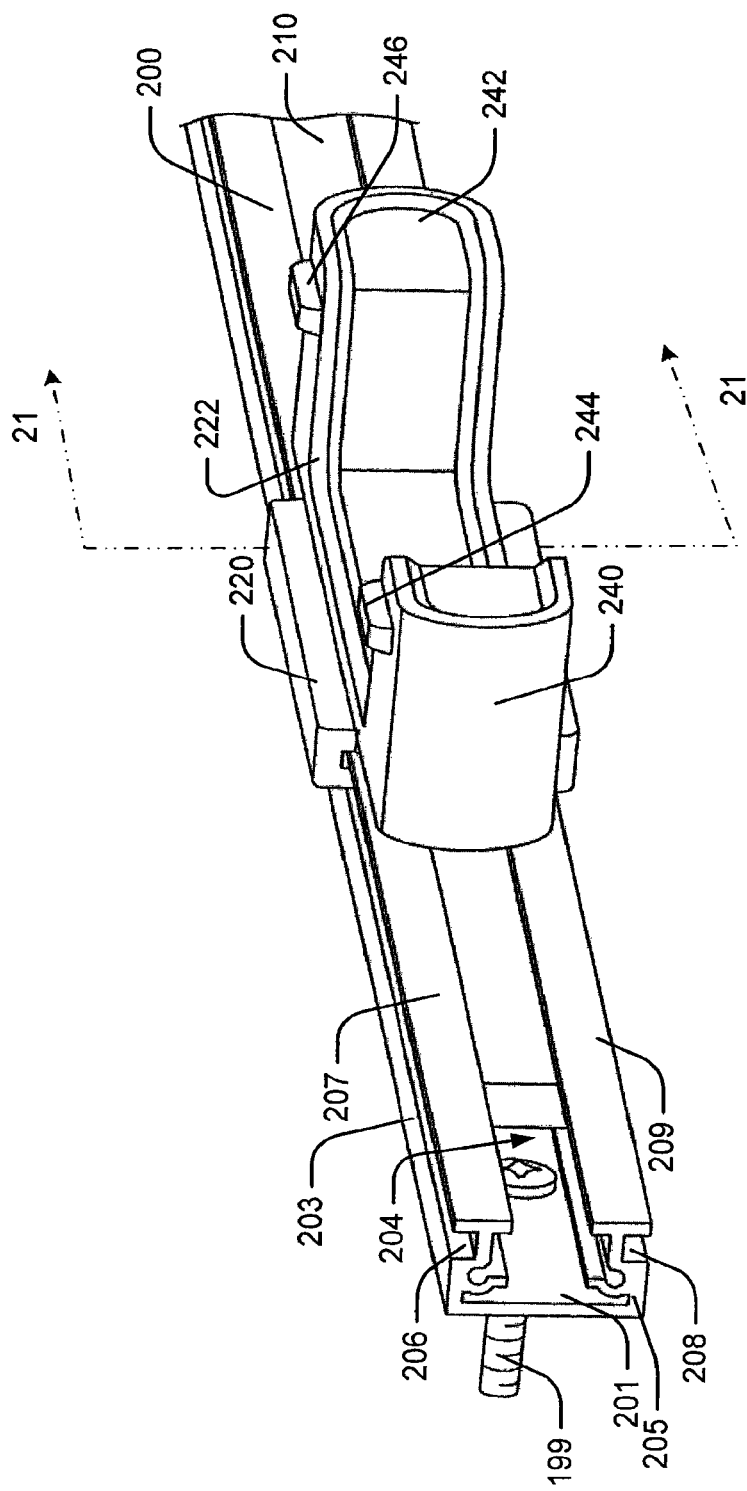
FIG. 20 is a perspective view showing the wall mounted panel support assembly shown in FIG. 13 in detail.
Figure 21:
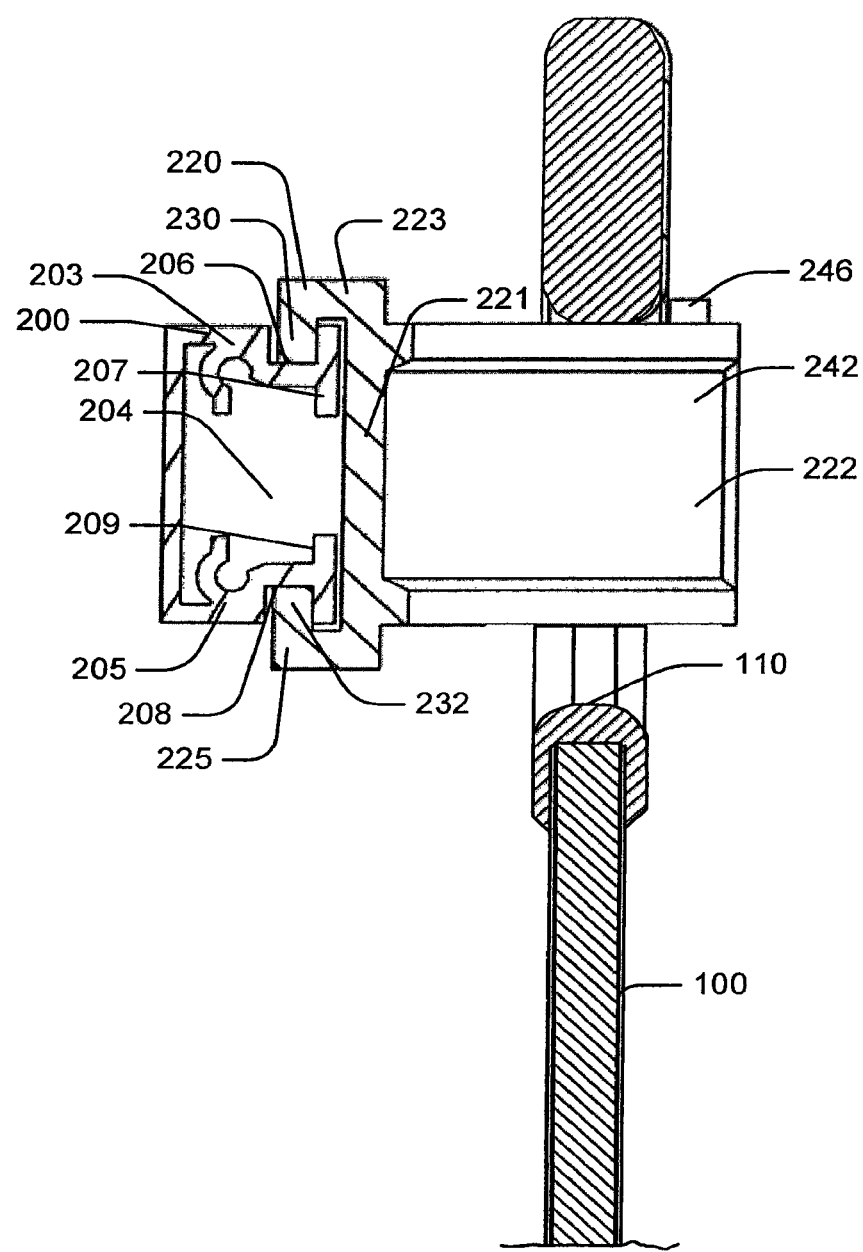
FIG. 21 is a cross sectional view taken along the line 21-21 in FIG. 20.

Referring again to FIG. 13, at least some embodiments also include a wall panel support assembly including a wall mounted track 200 and one or more slide assemblies 202. Referring also to FIGS. 20 and 21, track 200 is an elongated and rigid structure that includes a base member 201, top and bottom wall members 203 and 205, respectively, and top and bottom flange members 207 and 209, respectively. In at least some embodiments all of the members 201, 203, 205, 207 and 209 are integrally formed via an extrusion process or the like. Base member 201 is a flat elongated member that forms a plurality of mounting holes (not illustrated) that are generally equi-spaced along its length and that forms upper and lower straight and parallel edges.

Top wall member 203 extends along the top edge of base member 201 to one side of base member 201 and generally perpendicular to base member 201 and forms a portion of a top channel 206 along a distal edge. Similarly, bottom wall member 205 extends along the bottom edge of base member 201 to the one side of base member 201 and generally perpendicular to base member 201 and forms a portion of a bottom channel 208 along a distal edge.

Top flange 207 extends upward and downward along the distal edge of top wall member 203 where the upward portion of the flange forms part of the top channel 206 and the downward portion of the flange forms part of a central channel 204 between the top and bottom wall members 203 and 205. Bottom flange 209 extends upward and downward along the distal edge of bottom wall member 205 where the downward portion of the flange forms part of the bottom channel 208 and the upward portion of the flange forms part of the central channel 204 between the top and bottom wall members 203 and 205.

Referring still to FIGS. 20 and 21, exemplary slide assembly 202 includes a mounting structure 220 and a coupling structure 222 that, in at least some embodiments, are integrally formed via casting, molding, or the like out of polypropylene or plastic or some other suitable material. Mounting structure 220 includes a base plate member 221, top and bottom wall members 223 and 225 and top and bottom lip members 230 and 232, respectively. Plate member 221 is a flat rigid member having parallel top and bottom edges. Top wall member 223 extends to one side of plate member 221 generally perpendicular thereto and along the entire top edge of plate member 221. Similarly, bottom wall member 225 extends to the one side of plate member 221 generally perpendicular thereto and along the entire bottom edge of plate member 221. Top lip member 230 and bottom lip member 232 extend from distal edges of top and bottom wall members 223 and 225, respectively, toward each other, leaving a gap there between. The members that form structure 220 are dimensioned so that lip members 223 and 225 can be simultaneously received in channels 206 and 208 formed by track member 200 as shown in FIG. 21.

Referring again to FIGS. 20 and 21, coupling structure 222 is secured to or integrally formed with mounting structure 220 and extends there from in a direction opposite the direction in which wall members 223 and 225 extend. Coupling structure 222 has a construction that is similar to the construction of finger members 64 and 66 described above and as shown in FIGS. 1, 3, 4 and 5 so that panels 100 can be coupled to structure 222 in a fashion similar to that described above. More specifically, structure 222 includes first and second spaced apart finger members 240 and 242 that extend to distal ends. Ribs 244 and 246 are provided on the top surfaces of the finger members 240 and 242 at the distal ends to help retain panels on the fingers after coupling. The fingers 240 and 242 may only be long enough to support a single panel 100 or may be longer to support two or more panels 100.

Referring again to FIG. 19, to mount a track 200 to a wall, screws 199 are fed through the mounting holes formed by base member 201 and are received in mounting holes formed in the wall surface. A cork strip 210 may be slid into the central channel 204 where flanges 223 and 225 retain the cork strip in channel 204 after installation. The cork strip 210 is useful for tacking papers or the like for viewing and also serves to cover the screw heads in channel 204.

Once an assembly 200/202 is slid onto the track as shown in FIGS. 20 and 21, the assembly 200/202 can be slid to any location on the track length.

Figure 22:
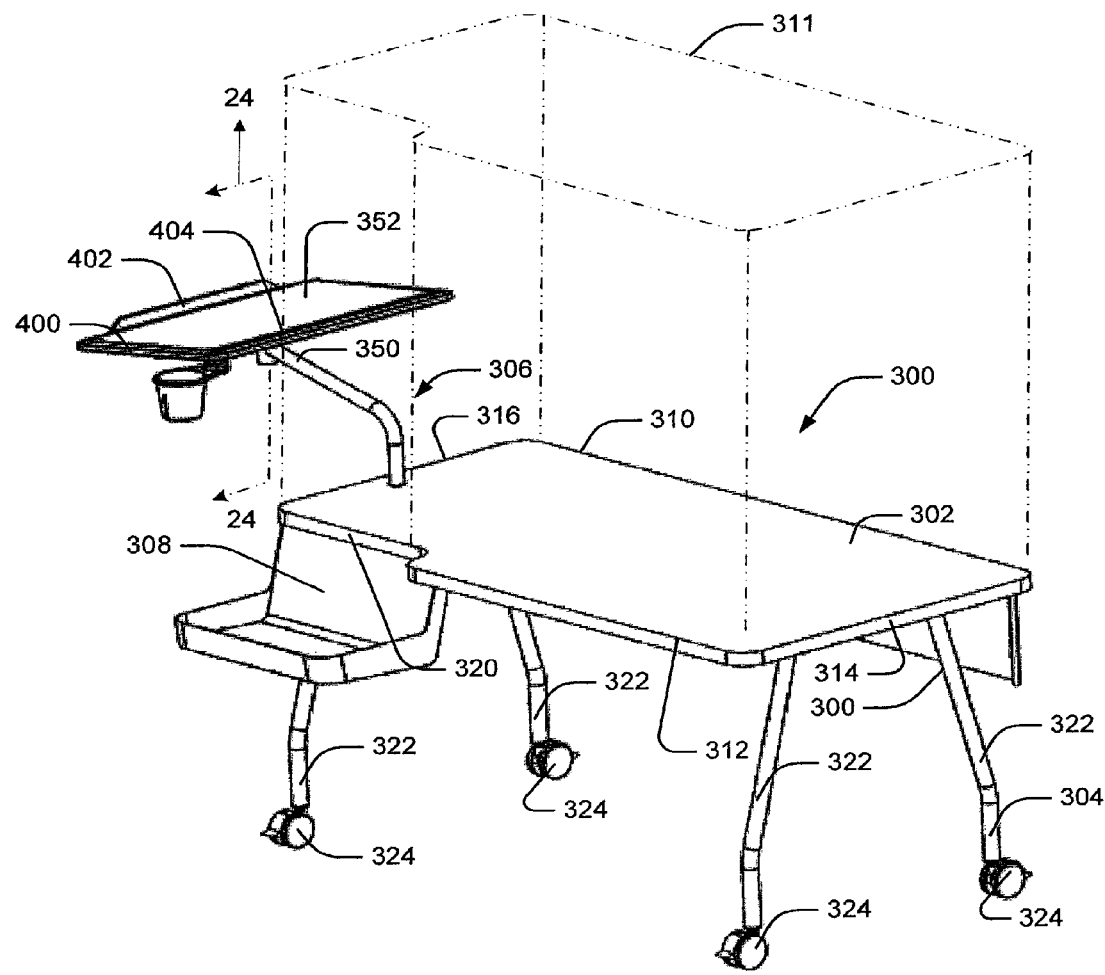
FIG. 22 is a perspective view of the lectern/table assembly shown in FIG. 13.

Referring now to FIG. 22, at least some systems that are consistent with at least some aspects of the present disclosure include a lectern/table assembly 300 that may be used by a teacher or other person (e.g., a student) presenting to a small or large group within a classroom. Exemplary assembly 300 includes a table top member 302, a leg support structure 304, a lectern subassembly 306 and a lower shelf assembly 308. Table top member 302 includes a rigid generally rectangular member that includes substantially parallel front and rear edge portions 310 and 312 and first and second lateral side edge portions 314 and 316, respectively, where a length dimension between the front and rear edges is greater than a width dimension between the first and second side edges. For instance, in at least some embodiments, the length dimension may be four feet while the width dimension is between 24 and 36 inches. Other dimensions are contemplated. In at least some embodiments a corner of the top member 302 is notches out to form a notch 320 that extends part way along the rear edge 312 and that opens to the second side edge 316. A space column 311 is formed above the top surface of top member 302 as shown in FIG. 22.

Exemplary leg subassembly or structure 304 includes four relatively simple elongated and rigid leg members 322 having lockable casters or wheels 324 mounted at bottom ends where top ends are mounted to the undersurface of top member 302, one leg member adjacent each of the four corners of member 302. The leg members 322 support top member 302 so that a top surface of member 302 is horizontal. Wheels 38 facilitate movement of assembly 300 within a classroom space for use in various locations.

Figure 23:
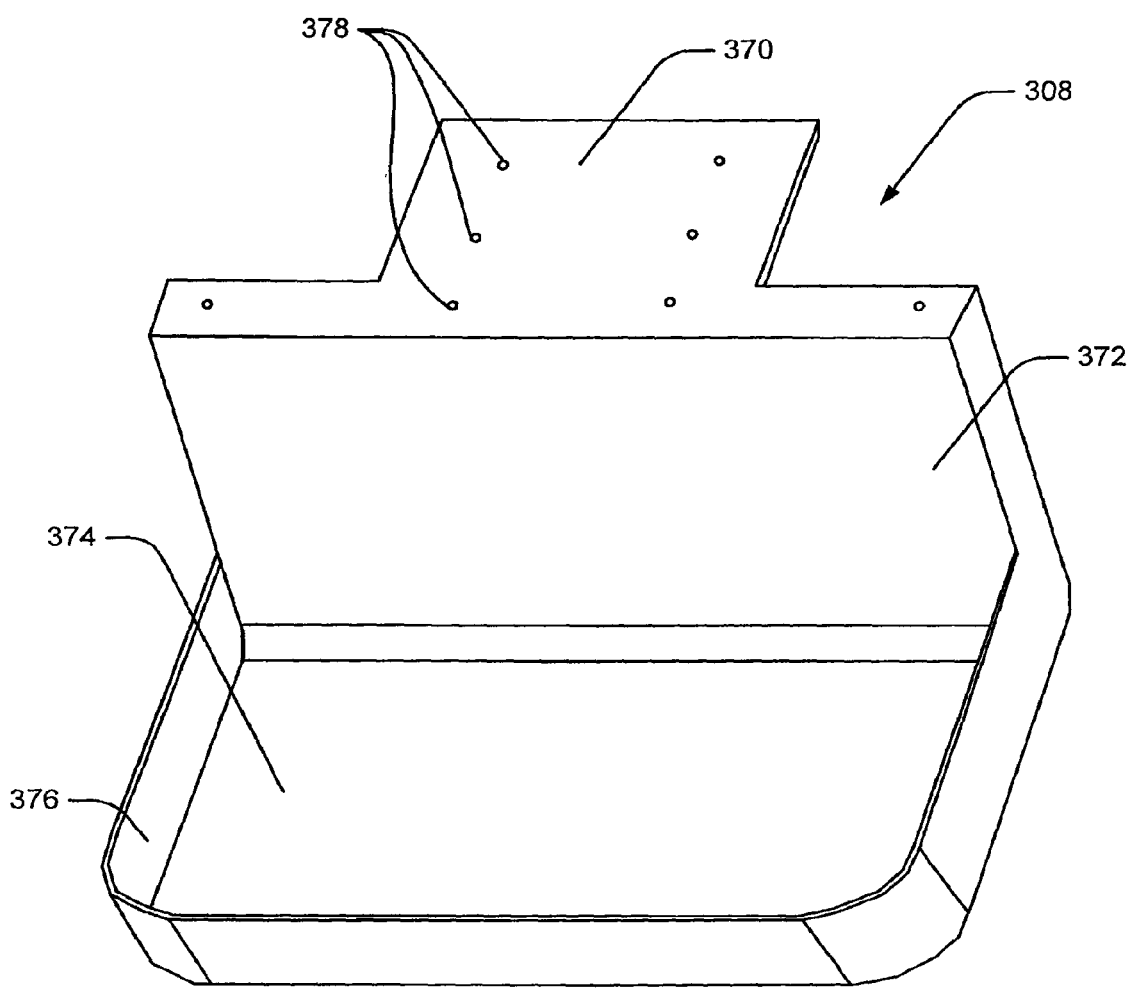
FIG. 23 is a perspective view of the lower shelf assembly of FIG. 21.

Referring still to FIG. 22 and now also to FIG. 23, shelf assembly 308 is a rigid structure that may be formed out of bent sheet metal or in some other fashion to yield an integral component. In the illustrated embodiment, shelf assembly 308 includes a mounting plate 370, a support wall 372, a shelf member 374 and a rim member 376. Mounting plate 372 is a flat rigid plate member that forms, among other edges, an elongated edge and that forms a plurality of mounting holes 378. Support wall 372 extends from the elongated edge of plate 370 substantially perpendicular to plate 370 or so as to form a slightly obtuse angle therewith down to a bottom edge. Shelf member 374 extends from the bottom edge of support wall 372 to a side of support wall opposite the side to which plate 370 extends and generally parallel to plate 370. Rim member 376 extends upwardly around the edge of shelf member 374 to form a shallow box-like receiving space that is upwardly open.

Referring still to FIGS. 22 and 23, shelf assembly 308 mounts to the undersurface of top member 302 via screws that pass through mounting holes 378. In the illustrated embodiment assembly 308 is mounted to the undersurface of member 302 with the elongated edge of plate 370 adjacent and generally parallel to the edge portion that forms the top member notch 320 such that the shelf member 374 resides at least partially below the notch space 320. Once installed, the shelf assembly 308 provides a rimed shelf space for placement of a briefcase, a book bag, a computer or any other objects that may be useful to a person using the lectern/table assembly 300. While shelf assembly 308 is shown along rear edge 312 and below the notch space 320, shelf assembly 308 could be mounted at other locations such as, for instance, along side edge 316 so that the shelf would be formed to a side of table top member 302.

Figure 24:
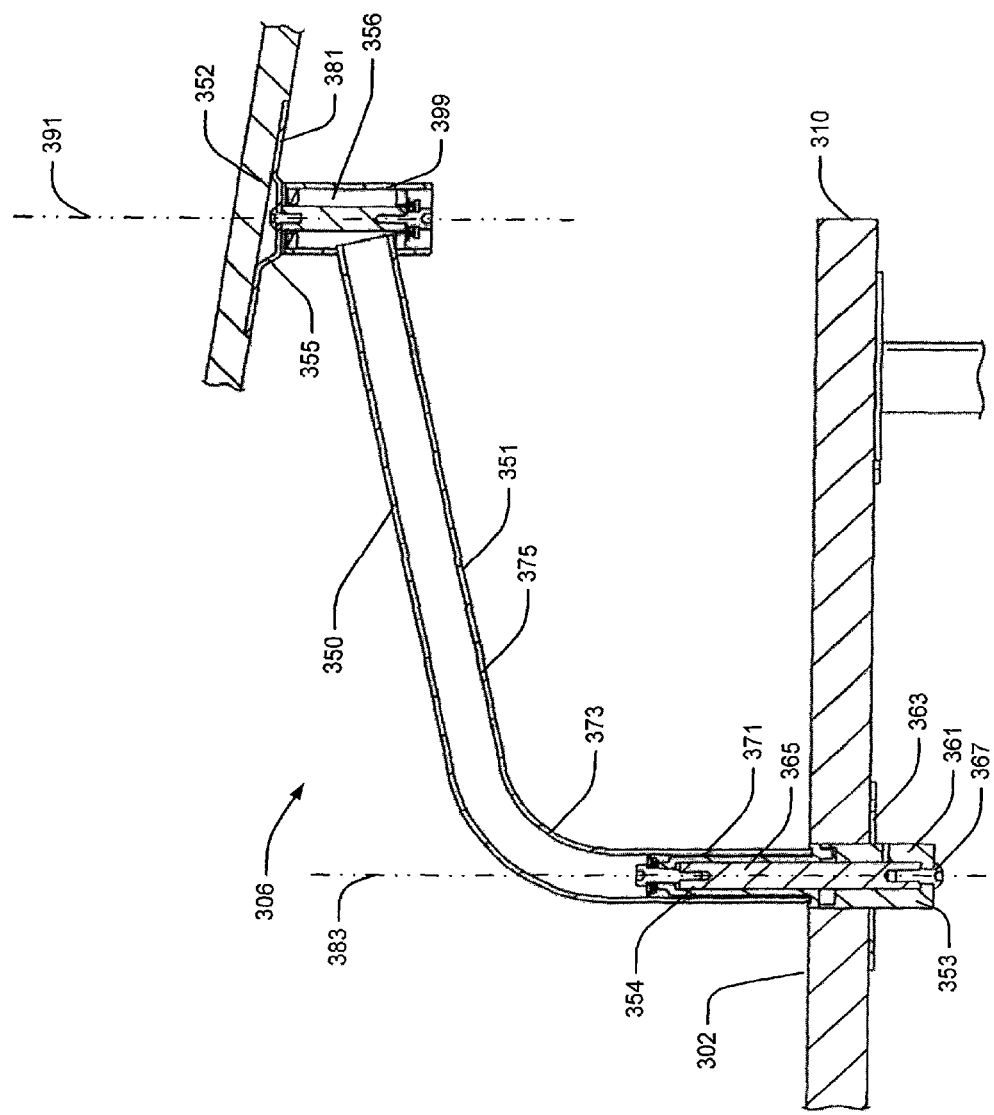
FIG. 24 is a cross sectional view taken along the line 24-24 in FIG. 22.

Referring again to FIG. 22, lectern subassembly 306 includes an arm assembly 350 and a lectern member 352. Referring also to FIG. 24, arm assembly 350 includes a rigid arm member 351, a first mounting subassembly 353, a second mounting subassembly 355, a first pivot subassembly 354, and a second pivot subassembly 356. Arm member 351 includes a bent hollow tube member formed of steel or aluminum that has a straight lower portion 371, a bent intermediate portion 373 and a straight upper portion 375. The lower portion 371 is approximately one third to one fifth the length of the upper portion 375 and the bend causes the upper portion 375 to form a slightly obtuse angle with the lower portion 371. Thus, when arm member 351 is mounted with lower portion 371 substantially vertical as illustrated in FIG. 24, the distal end that forms the upper portion 375 angles upwardly.

Referring still to FIG. 24, the first mounting subassembly 353 includes a plate member 363 that mounts via screws or other mechanical fasteners (not shown) to the undersurface of top member 302 adjacent an opening (not labeled) formed in member 302. A first turret 361 is integrally formed with the mounting plate 363 and extends upward through the opening in member 302. Turret 361 forms a central cylindrical opening that opens upward when mounted to member 302.

The first pivot subassembly 354 includes a pin 365 that that extends downward from the lower end 371 of member 351. One or more bushings and Bellville washers are provided between lower end 371 and the pin to enable arm member 351 to rotate about the pin 365 after installation. Pin 365 forms a threaded opening in a lower end. Pin 365 is received in the central cylindrical opening formed by first turret 361 and a bolt 367 passes through an opening in an underside of turret 361 into the threaded opening in the lower end of pin 365. After arm member 351 is installed as described above, member 351 can be rotated through 360 degrees about an axis 383 formed by pin 365.

Referring still to FIG. 24, second mounting subassembly 355 includes a plate 381 that mounts to an undersurface of lectern member 352 via screws or other mechanical fasteners (not illustrated). Plate 381 forms a central recess in which a screw head resides upon installation.

Second pivot subassembly 356 includes a second turret 399 that is integrally connected to the upper distal end of arm member 351 to define a second axis 391 that is parallel to and spaced from first axis 383 by arm member 351. Subassembly 356 also includes one or more Bellville washers and bushings as well as a pivot pin that cooperates with a couple of bolts to connect plate 381 to the top end of turret 399 so that plate 381 and member 352 mounted thereto can rotate through 360 degrees about second axis 391.

Referring to FIG. 24, plate 381 includes a top surface that is, in the illustrated embodiment, generally angled slightly with a horizontal plane so that when member 352 is mounted to the top surface of plate 381, lectern member 352 likewise includes a top surface that is slightly angled. Referring also to FIG. 22, a slightly upwardly extending lip 400 may be provided around the entire edge of member 352 to help retain materials on the top surface of member 352. A larger lip 402 may be provided along a rear edge of member 352 where the rear edge is along the lower portion of member 352. A pencil tray or the like 404 may be provided along an upper front edge portion of member 352 for retaining pencils, pens, or other accessories.

Figure 25:
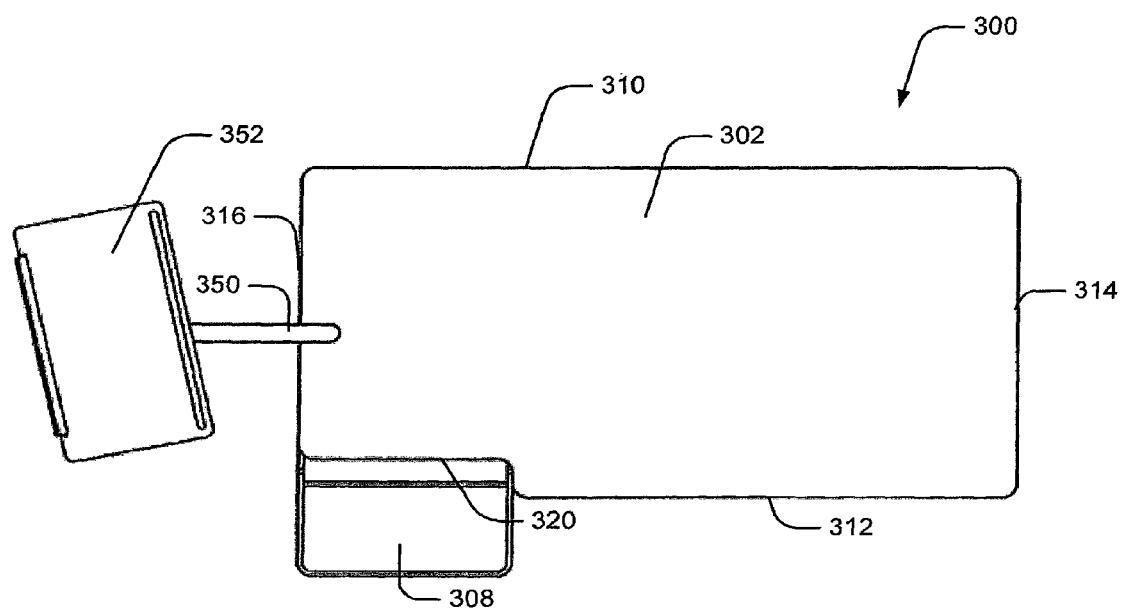
FIG. 25 is a top plan view of the assembly shown in FIG. 22.

Referring again to FIG. 22 and now also to FIG. 25, in at least some embodiments lower end 371 of arm member 351 is mounted to top member 302 adjacent the second lateral or side edge portion 316 and substantially midway between the front and rear edges 310 and 312, respectively as shown. When mounted adjacent edge 316 and midway between edges 310 and 312, assembly 300 has been found to be particularly useful. To this end, when so mounted, the lectern assembly 306 is generally disposed at one end of the table assembly which frees up the second end of the table for a teacher or student to use as a desk or a table at a sitting height.

In addition, when so mounted, the lectern member 352 may be parked to the side of edge 316 outside the space column 311 (see again FIG. 22) as illustrated in FIG. 25 when a teacher wants to assume a location to the side of the table during a lecture. For instance, referring again to FIG. 13, it may be that a teacher is presenting information via a large whiteboard 500 near the front of a classroom space and may want to stand generally to the side of assembly 300 to view the presented information to the left and to be able to view students within the space to the right. The FIG. 25 lectern position facilitates this type of arrangement.

Figure 26:
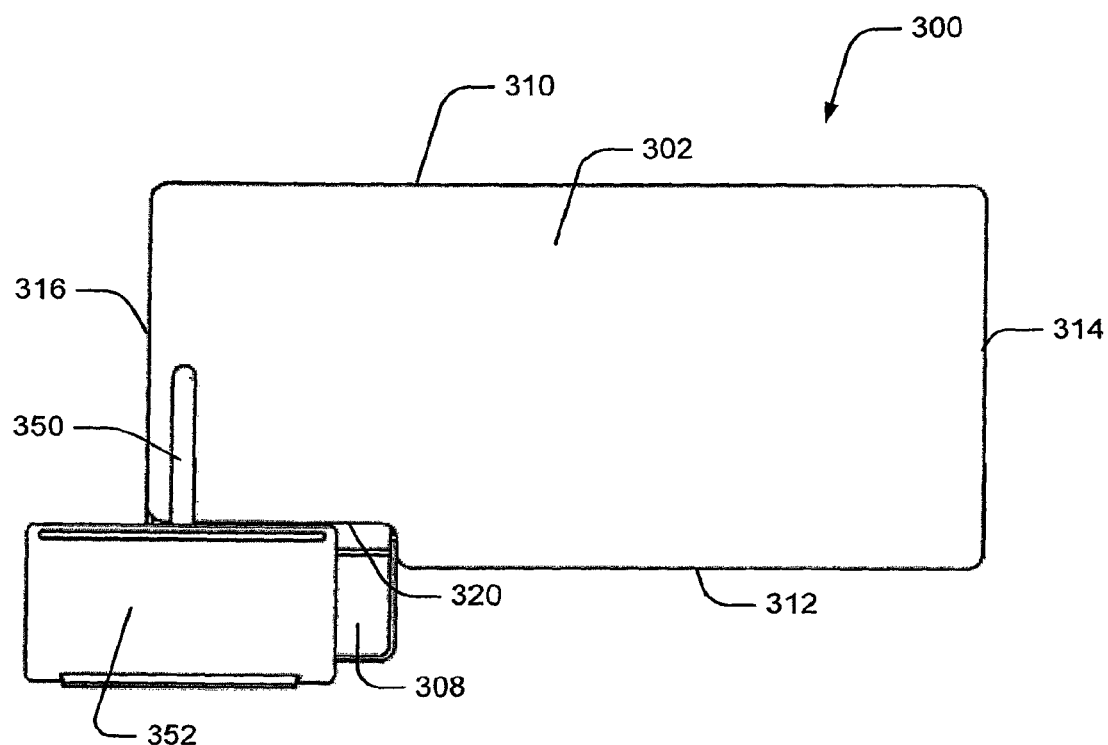
FIG. 26 is similar to FIG. 25, albeit showing a lectern subassembly in a different position.

Moreover, when so mounted, the lectern member 352 may be parked in a location where at least a portion thereof is located rearward of space column 311 and generally above shelf subassembly 308 as shown in FIG. 26. In this configuration a teacher can stand behind the table assembly 300 and generally face students in a classroom to facilitate a conventional lecture and may have easy access to materials or resources that are stored on the shelf 308 formed there below.

Figure 27:
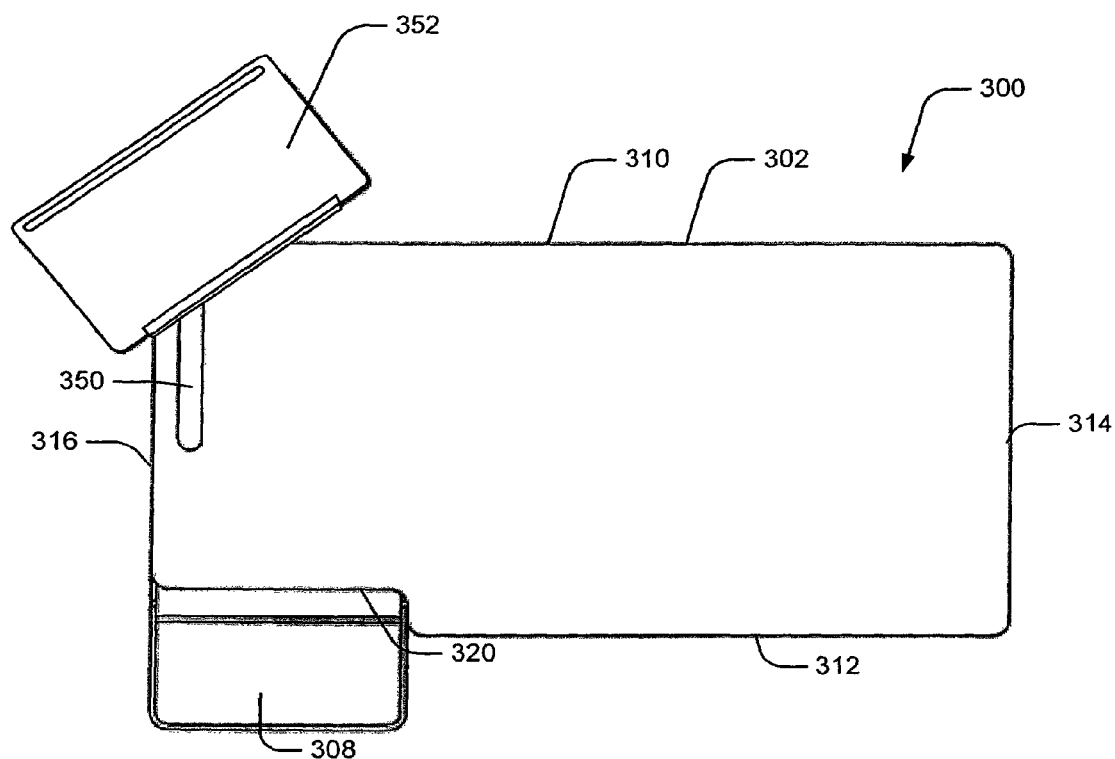
FIG. 27 is similar to FIG. 25, albeit showing the lectern subassembly in another position.

Furthermore, when so mounted, a lectern member 352 may be parked in a location where at least a portion thereof is located forward of the space column 311 as shown in FIG. 27. In this configuration a teacher can sit back on the front edge 310 of top member 302 near lectern member 352 assuming a position closer to students in the classroom with support materials resting on the top surface of member 352 for reference. Other lectern to table juxtapositions are contemplated.

Figure 28:
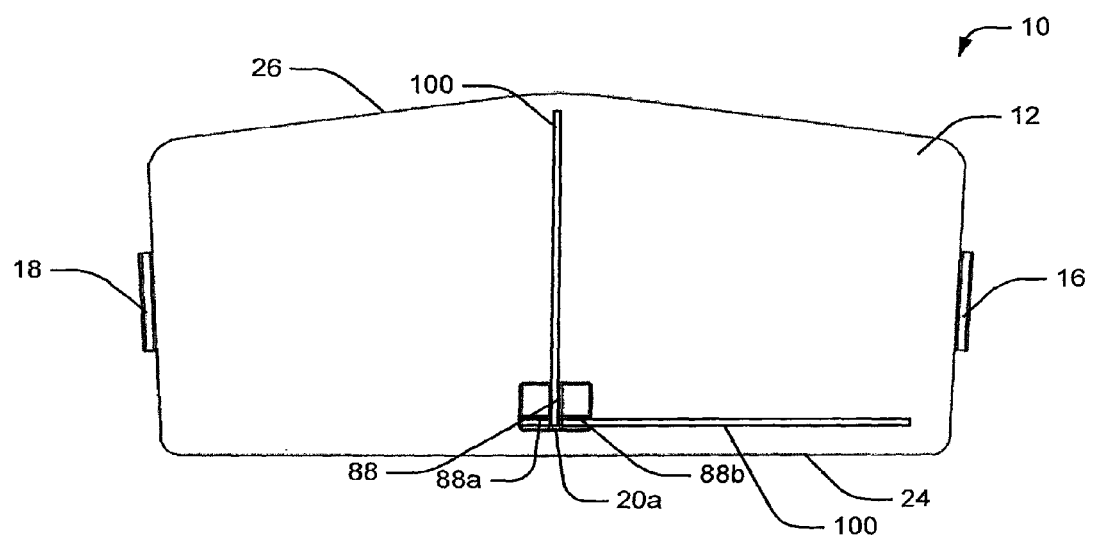
FIG. 28 is a top plan view similar to the view shown in FIG. 2, albeit with a different type of central dock component that can support multiple panels in different orientations.

Referring to FIG. 28, in at least some embodiments a central dock component 20a with a slightly different configuration may be provided that can support panels 100 along front edge 24 as well as down the middle of top member 12. In this regard, in addition to forming central channel 88, component 20a may form laterally and upwardly opening channels 88a and 88b dimensioned to grip corner portions of a panel edge 104 as described above. In FIG. 28, panels 100 are shown supported in channels 88 and 88b while channel 88a is open.

Figure 29:
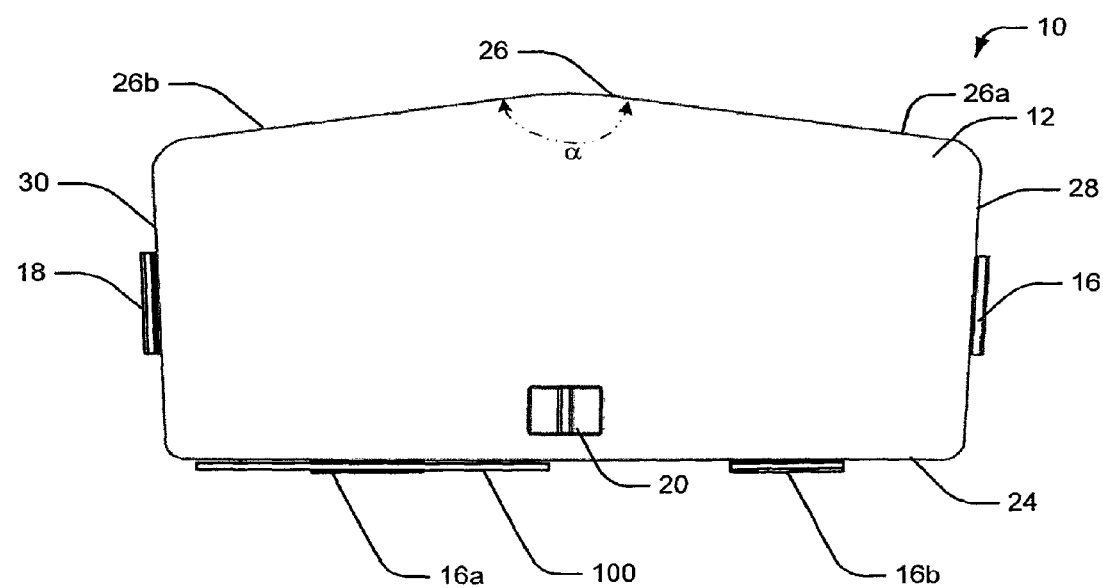
FIG. 29 is a top plan view similar to the view shown in FIG. 2, albeit showing a table assembly including side dock components along a front edge of a table top member as well as along side edges.

Referring to FIG. 29, in some embodiments side edge docks 16a and 16b as well as storage coupling components (see again 42 in FIG. 6) may be mounted to the undersurface of top member 12 adjacent front edge 24 for supporting panels 100 in additional storage positions and/or in space dividing positions adjacent front edge 24. In this case stored panels below front edge 24 also operate as modesty panels. In FIG. 29 a panel 100 is shown in dock components 16a while dock components 16b is open.

Figure 30:
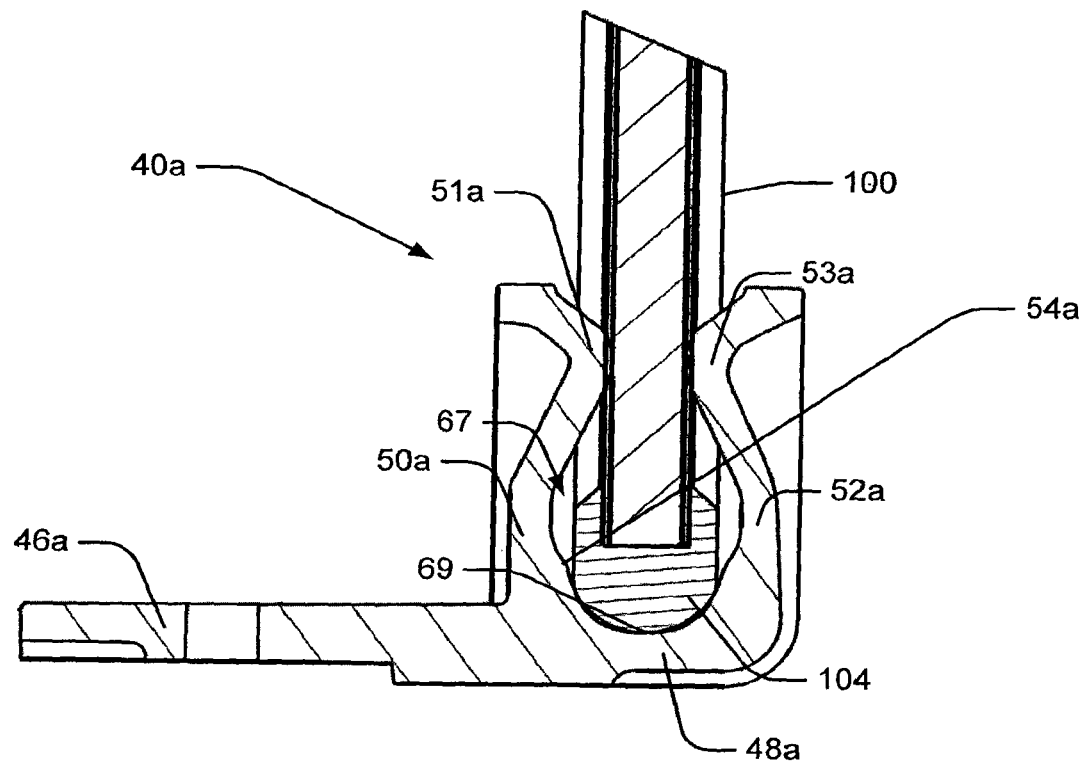
FIG. 30 is a cross sectional view of another embodiment of a side dock component and a portion of a panel that is consistent with at least some aspects of the present disclosure.

FIG. 30 shows a cross sectional view of a side table dock component 40a that has a more contoured channel 54a shape than the dock component 40 described above and shown in FIGS. 4 and 6. Like component 40, component 40a includes a mounting flange 46a, a base wall member 48a, and a first and second spaced apart side wall members 50a and 52a that form channel 54a. Walls 48a, 50a and 52a, however, are contoured to form a seat or pocket 69 at the lower end of the channel 54a that is shaped to receive a lower surface of a panel 100 as well as to form restricted facing surfaces 51a and 53a at distal ends of wall members 50a and 52a so that panel 100 can be held in place securely at two locations to reduce lateral wobble.

Above pocket 69 and below the restricted facing surface portions 51a and 53a, facing surfaces of wall members 50a and 52a define a relatively wide space 67 which is much wider than the thickness of the panel rim or frame 104. This extra space 67 allows a student to rotate panel 100 in the plane of the FIG. 30 cross section by applying a force greater than a threshold level to a side of panel 100. Frame 104 rides up the curved pocket 69 and into the wider area 67. As more force is applied, a panel 100 rotates completely out of channel 54a and pops out of dock 40a without damaging the dock 40a or the panel.

Referring still to FIG. 30, angled lead in and lead out surfaces that form surface portions 51a and 53a minimize insertion and removal forces and also help guide a student to align a panel 100 prior to insertion.

While one student table top shape is shown in the example described above, other useful shapes are contemplated. For instance, the top shape may be a proper rectangle with 90 degree corners. The shape may have a longer length dimension and accommodate more than two students along a rear edge. The shape may accommodate two students along the front edge as well as two students along the rear edge. In addition, a table assembly may include two or more central dock components to divide a table top space into more than two spaces for use by more than two students.

Electronic Display Embodiments

While the above systems and assemblies have been described as including whiteboard type display panels that are useful for sharing information among teachers and students, other embodiments are contemplated wherein all or at least a subset of the panels 100 described above may be replaced by one or two sided flat panel electronic display devices. For instance, referring again to FIG. 13, each of the illustrated panels 100 may be replaced with a thin (e.g. 1/8th to 1/2 inch thick) electronic display device for presenting output from software applications that can be shared. In at least some embodiments the electronic displays may include hardware for sensing interaction with the surfaces thereof so that each of the display panels can be used as an electronic whiteboard.

As in the case of the non-electronic whiteboard systems described above, in at least some embodiments students may share information by mounting their electronic displays to easel 150 or to one of the wall mounted assemblies 202 as described above. In the alternative, students may share information on their displays with a small group by mounting the displays to the student tables via docks 16, 18 or 20.

Referring again to FIG. 13, in at least some embodiments it is contemplated that large board 500 may be an electronic display or electronic whiteboard structure and that a student may be able to flip images or application output from one of the electronic panels 100 to board 500 for sharing. When an image is flipped, the flipped image may be the same size as the original image or may be increased in size for presentation to the larger group. In the alternative, flipped images may be added to an "on-deck" queue having a smaller size suitable for close viewing by a teacher that could then be selected to increase size for viewing by students in the larger classroom space.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

To apprise the public of the scope of this invention, the following claims are made.

What is claimed is:

1. A lectern assembly comprising:
a table assembly including a top member and at least a first leg support member, the top member forming a substantially flat top surface at a first height and circumscribed by an outer edge that defines the boundaries of a space column disposed above the top surface, the top member including oppositely facing front and rear edge portions, the leg support member supporting the top member in a substantially horizontal position;
a lectern support subassembly mounted to the table assembly at a point midway between the oppositely facing front and rear edge portions and extending upward to an upper end at a second height above the first height, the lectern support subassembly including a rigid arm assembly having upper and lower ends, the lower end mounted to the top member for pivotal rotation about a first vertical axis, the upper end of the arm assembly at a second height above the first height;
a substantially flat lectern member having oppositely facing top and bottom surfaces and circumscribed by a lectern member edge, the bottom surface of the lectern member supported at the upper end of the lectern support assembly for movement between a plurality of different juxtapositions including at least a first juxtaposition where at least a portion of the lectern member resides outside and to a front edge side of the space column, a second juxtaposition where at least a portion of the lectern member resides outside and to a rear edge side of the space column, and a third juxtaposition where at least a portion of the lectern member resides outside and to a lateral edge of the space column, wherein the arm assembly pivots with respect to the first vertical axis to move the lectern member between the first, second, and third juxtapositions, wherein rotation of the arm is restricted to rotation about the first vertical axis.

2. The assembly of claim 1 wherein the bottom surface of the lectern member is mounted to the distal end of the arm assembly for pivotal rotation about a second vertical axis that is spaced apart from the first vertical axis by the arm assembly.

3. The assembly of claim 1 wherein the edge of the lectern member includes oppositely facing front edge and rear edge portions and wherein the rear edge portion of the lectern member resides to a rear edge side of the space column when the lectern member is in the second juxtaposition and wherein the front edge portion of the lectern member resides to a front edge side of the space column when the lectern member is in the first juxtaposition.

4. The assembly of claim 1 wherein the top member is substantially rectangular shaped and wherein the lectern member is substantially rectangular shaped.

5. The assembly of claim 4 wherein the top member edge further includes oppositely facing first and second lateral edge portions that extend between the front and rear edge portions and wherein the proximal end of the arm assembly is mounted to the top member adjacent the first lateral edge portion.

6. The assembly of claim 1 wherein a notch is formed in the rear edge portion of the top member, the lectern assembly further including a shelf member supported by at least one of the leg support member and the top member within a space below the notch at a third height that is lower than the first height and wherein at least a portion of the lectern member resides above the shelf member when the lectern member is in the first juxtaposition.

7. The assembly of claim 1 wherein the second height is at least eight inches above the first height.

8. A lectern assembly comprising:
a table assembly including a table top member and at least a first leg support member, the table top member forming a substantially flat table top surface at a first height, the table top member having oppositely facing front and rear edges, the leg support member supporting the table top member in a substantially horizontal position;
a rigid arm assembly coupled to the table top member, the arm assembly including a lower portion and an upper portion each having a length dimension extending substantially perpendicular to the table top member, the upper portion being offset a distance horizontally from the lower portion, and an intermediate portion extending between and connecting the upper portion to the lower portion, the lower portion of the arm assembly being rotatably mounted to the table top member only at a midpoint between the oppositely facing front and rear edges, and
a lectern member rotatably coupled to the upper portion of the arm assembly, the lectern member being supported at a second height above the first height.

9. The assembly of claim 8, wherein the arm assembly comprises a lower pivot subassembly for rotatably coupling the arm to the table top member, and an upper pivot subassembly for rotatably coupling the lectern member to the arm assembly, the upper pivot subassembly defining an upper pivot axis and the lower pivot subassembly defining a lower pivot axis, wherein the lower pivot axis is parallel to and spaced from the upper pivot axis.

10. The assembly of claim 9, wherein the lower pivot subassembly includes a pin extending downward from the lower end the arm member, and the arm member is rotatable through 360 degrees about an axis defined by the pin.

11. The assembly of claim 9, wherein the upper pivot subassembly includes an upper turret coupled to the upper distal end of the arm member.

12. The assembly of claim 8, wherein the intermediate portion angles between the lower and upper portions.

13. The assembly of claim 8 wherein the upper portion of the arm is coupled to a lectern mounting subassembly that mounts to the underside of the lectern member, the mounting subassembly including a mounting plate that is angled with respect to the table top member, wherein the lectern member is angled with respect to the table top member.

14. The assembly of claim 13, wherein the lectern mounting subassembly further comprises a pivot pin coupled to a top end of an upper turret, and wherein the lectern member is rotatable through 360 degrees about an upper pivot axis defined by the pin.

15. The assembly of claim 8, wherein the arm member assembly comprises an arm mounting subassembly including a mounting plate that mounts to the undersurface of the table top member adjacent an opening formed in the table top member.

16. The assembly of claim 15, further comprising a lower turret integrally formed with the mounting plate and extending upward through the opening.

17. A lectern assembly comprising:
a table assembly including a table top member and at least a first leg support member, the table top member forming a substantially flat table top surface at a first height, the leg support member supporting the table top member in a substantially horizontal position;
a lectern member supported at a second height above the first height; and
a rigid arm assembly coupled between the table top member and the lectern member, the arm assembly including:
a lower arm portion rotatably mounted to the table top member only through a lower pivot subassembly comprising a lower turret extending upward through an opening in the table top member and defining a lower pivot axis at a midpoint between oppositely facing front and rear edge portions of the table top member,
an upper arm portion including an upper pivot subassembly rotatably coupling the lectern member to the arm assembly, the upper pivot subassembly comprising an upper turret defining an upper pivot axis, and
an intermediate arm portion extending between and connecting the upper arm portion to the lower arm portion,
wherein the lower pivot axis is substantially parallel to and offset a horizontal distance from the upper pivot axis, and rotation of the arm is constrained to rotation about the lower pivot axis.

18. The lectern assembly of claim 17, wherein the arm member is rotatable through 360 degrees around the lower pivot axis, and the lectern member is rotatable through 360 degrees around the upper pivot axis.

* * * * *